United States Patent
Yang et al.

(10) Patent No.: US 12,401,398 B2
(45) Date of Patent: Aug. 26, 2025

(54) CODEBOOK DESIGN

(71) Applicant: Apple Inc., Cupertino, CA (US)

(72) Inventors: Weidong Yang, San Diego, CA (US); Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/797,080

(22) PCT Filed: Sep. 3, 2021

(86) PCT No.: PCT/CN2021/116516
§ 371 (c)(1),
(2) Date: Aug. 2, 2022

(87) PCT Pub. No.: WO2023/029000
PCT Pub. Date: Mar. 9, 2023

(65) Prior Publication Data
US 2024/0187048 A1    Jun. 6, 2024

(51) Int. Cl.
*H04B 7/0456* (2017.01)
*H04B 7/0417* (2017.01)
*H04B 7/06* (2006.01)

(52) U.S. Cl.
CPC ........ *H04B 7/0456* (2013.01); *H04B 7/0417* (2013.01); *H04B 7/0626* (2013.01)

(58) Field of Classification Search
CPC .. H04B 7/0456; H04B 7/0417; H04B 7/0626; H04B 7/10; H04B 7/0478
See application file for complete search history.

(56) References Cited

U.S. PATENT DOCUMENTS

| 2017/0187441 A1* | 6/2017 | Manolakos .......... H04B 7/0663 |
| 2017/0250747 A1 | 8/2017 | Reinhardt et al. |

(Continued)

FOREIGN PATENT DOCUMENTS

| CN | 107251451 A | 10/2017 |
| CN | 107409017 A | 11/2017 |

(Continued)

OTHER PUBLICATIONS

International Patent Application No. PCT/CN2021/116516, International Search Report and Written Opinion, Mailed on May 25, 2022, 9 pages.

(Continued)

*Primary Examiner* — Jung H Park
(74) *Attorney, Agent, or Firm* — Kilpatrick Townsend & Stockton LLP

(57) ABSTRACT

The present application relates to devices and components including apparatus, systems, and methods to implement a codebook design for Doppler cases. For example, a multiple-input, multiple-output code configuration may be utilized for selecting components.

17 Claims, 20 Drawing Sheets

(56) References Cited

U.S. PATENT DOCUMENTS

| | | | |
|---|---|---|---|
| 2020/0028558 A1 | 1/2020 | Yerramalli et al. | |
| 2020/0322012 A1* | 10/2020 | Wernersson | H04W 72/04 |
| 2020/0322027 A1* | 10/2020 | Tosato | H04L 1/1614 |
| 2023/0208588 A1* | 6/2023 | Hao | H04W 72/231 |
| | | | 370/329 |
| 2024/0007164 A1* | 1/2024 | Zhang | H04B 7/0478 |

FOREIGN PATENT DOCUMENTS

| | | |
|---|---|---|
| CN | 107534522 A | 1/2018 |
| CN | 108631846 A | 10/2018 |
| CN | 112514276 A | 3/2021 |
| WO | 2020182269 A1 | 9/2020 |

OTHER PUBLICATIONS

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

3rd Generation Partnership Project; Technical Specification Group Radio Access Network; NR; Physical layer procedures for data (Release 16), 3GPP TS 38.214 V16.6.0, Jun. 2021, 173 pages.

5G; Study on channel model for frequencies from 0.5 to 100 GHz (Release 16), ETSI, 3GPP TR 38.901 V16.1.0, Nov. 2020, 103 pages.

* cited by examiner

CODEBOOK DESIGN

CROSS-REFERENCE TO RELATED APPLICATION

This application is a 371 U.S. National Phase of PCT International Patent Application No. PCT/CN2021/116516, filed Sep. 3, 2021, which is herein incorporated by reference in its entirety for all purposes.

BACKGROUND

To facilitate communication between base stations and user equipments (UEs) in Third Generation Partnership Project (3GPP) networks precoders are implemented by the base stations for signals transmitted by the base stations. The base stations can determine the values for the precoders based on channel state information (CSI) signals fed back from the UEs. In particular, the UE performs measurements on signals received from the base stations and feeds back information regarding the measurements to be utilized for determining values for the precoders.

DETAILED DESCRIPTION

Figure 1:
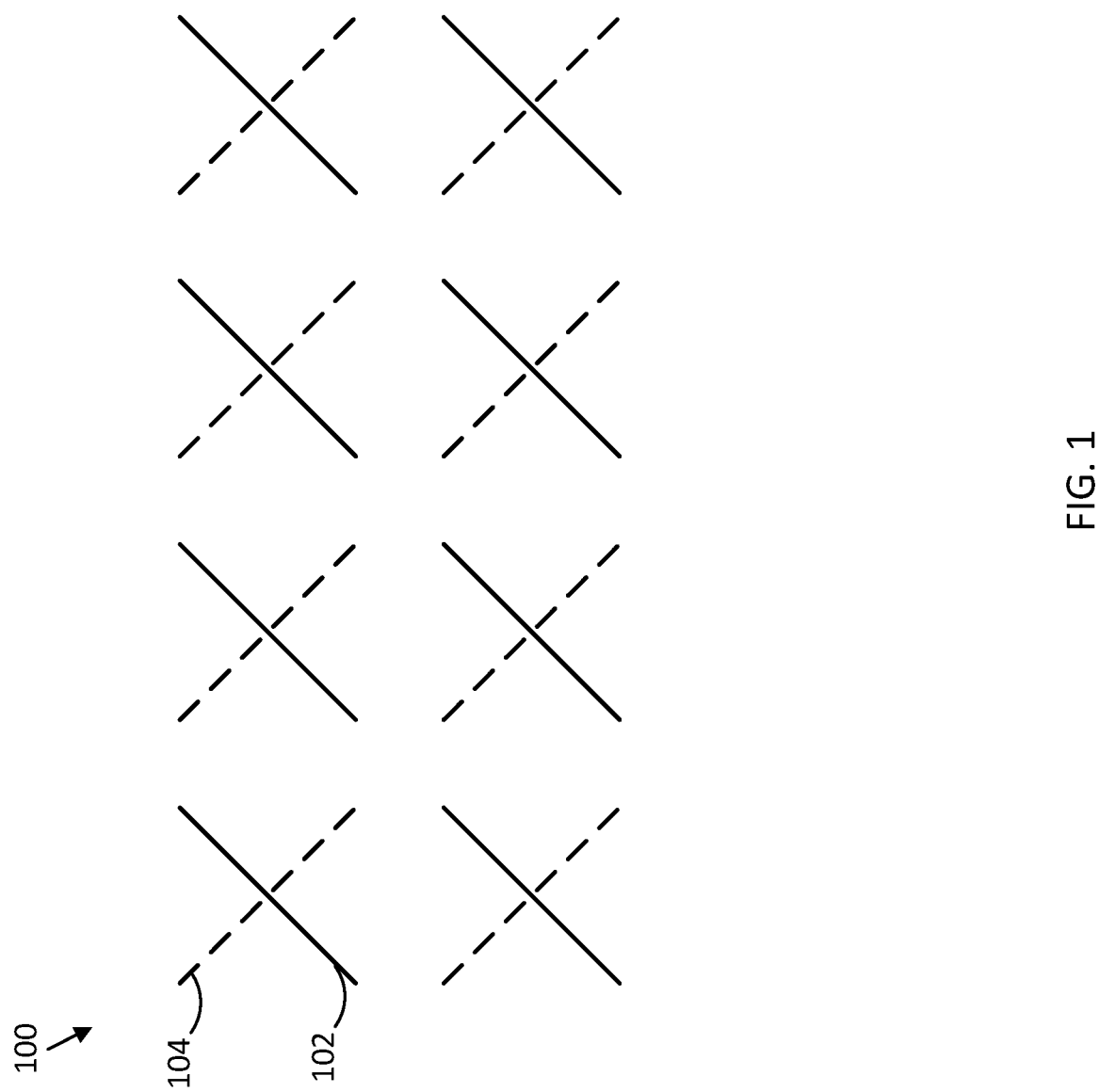
FIG. 1 illustrates an example antenna structure for a base station in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

In release 18 (Rel-18) of the third generation partnership project (3GPP) for radio access network (RAN), codebook design exploiting time domain correlation and predictive precoder for high Doppler cases may be included. Disclosed herein in some embodiments is designs exploiting parsimonious representation of the Doppler domain spread. With that, low feedback overhead can be achieved and downlink throughput with high Doppler cases can be improved. With the disclosed CSI feedback, CSI for multiple PDSCH occasions which can be spread into the time domain can be derived or obtained at the gNB. For each PDSCH occasion, PMI and channel quality indicator (CQI) including wideband CQI and subband CQIs can be derived or obtained at the base station. Further, by using an oversampling factor (Rd), multiple precoders for different orthogonal frequency division multiplexing (OFDM) symbols in the same physical downlink shared channel (PDSCH) can be derived by a base station, such as a next generation NodeB (gNB) (including the gNB 1900 (FIG. 19)).

Embodiments disclosed herein may introduce the Time-domain in the codebook design. For example, the user equipment (UE) can report selected spatial beams per Doppler component, can report selected frequency domain (FD) components per Doppler component, and/or can report selected time domain (TD) components. Further, the UE can report any or all of the number of selected spatial beams, the number of selected FD components, and/or the number of selected of TD components. The non-zero (NZ) linear coefficient (LC) coefficients' selection may be through a bitmap and component composition patterns. Alternatively, the NZ LC coefficients' selection may be through multiple bitmaps, or the Doppler offset may be predicted at least from the spatial beam, the delay offset, and/or the UE position.

To reduce signaling overhead, the component composition patterns and their occurrence frequencies can be indicated to the base station. Then a Huffman encoding scheme can be used to refer to those patterns instead of using bitmaps to reduce signaling overhead. The strongest LC coefficient among all spatial beams, FD components, TD components can be shifted to the origin position with respect to the FD component and TD component. The same shift may be applied to LC coefficients on all sheets.

LC quantization can be through a fixed quantizer (specified in the specification), parameterized quantizaters with parameters configurable by base station and/or reported by the UE. In some embodiments, the fixed quantizer may be predefined (such as being defined in a specification). Further, a UE can report a UE defined quantizer to the gNB in some embodiments.

To allow better quantization, UE-defined quantizer(s) can be provided to the gNB with radio resource control (RRC) signaling and/or medium access control (MAC) control element (CE) and/or channel state information (CSI) report. In addition, multiple versions can be concurrently active, and the UE can refer to the quantizer version in a CSI report.

For two stage quantization, LC coefficients can be divided into one or more set, and a reference amplitude may be determined for each set. The Time-domain dimension for the reported precoding matrix indicator (PMI) is determined by the largest gap between CSI feedback and the time where the last precoder can be used.

Embodiments herein may support the configuration of R_d to allow multiple precoders within the same slot/same PDSCH to account for high Doppler cases Embodiments herein may support differential encoding of subband channel quality indicators (CQIs) across time and/or frequency. Huffman encoding can be used to reduce the feedback overhead in some embodiments.

Embodiments herein may implement Rel-18 Type II enhancements with the Doppler domain compression. High speed scenarios and overhead reduction are two drivers for exploiting the Doppler domain. Further CSI feedback reduction considering the Doppler domain may be implemented by embodiments herein. From a single CSI feedback report, the base station can determine the precoders for multiple occasions of PDSCH transmissions. Release 15, 16, and 17 (Rel-15/16/17) design recommend against base station determining precoders for multiple occasions of PDSCH transmissions from a single CSI feedback report based on the PMI/CQI/rank indicator (RI) may become obsolete quickly after the CSI feedback report due to channel aging. Hence a design goal in Rel-18 may be to handle time-varying channels better.

Note this is also pertinent to CSI feedback complexity. With the Rel-15/16/17 design, the base station can still work with the current design even encountering high mobility at the UE by triggering frequent CSI reports (the full Type II codebook feedback is not supported over physical uplink control channel (PUCCH), so aperiodic CSI reports should be used in that case). With the Rel-18 design, the UE may be able to generate CSI feedback report with a validity time much longer than that with legacy CSI feedback from Rel-15/16/17.

Due to the minimum time gap between aperiodic (AP) CSI reporting trigger and the CSI reporting over PUCCH or physical uplink shared channel (PUSCH) (Z) and the minimum gap between AP CSI measurement resources and the CSI reporting over PUCCH or PUSCH(Z'), frequent triggering with the Rel-15/16/17 CSI reports may still not be enough to handle channel aging. Hence there is also a real need to handle wireless channels with high mobility.

Another potential benefit can be lower system overhead for measurement resources. Instead of providing aperiodic (AP) channel state information reference signal (CSI-RS) resources for channel measurement resource (CMR) and/or interference measurement resource (IMR) for each AP CSI report, a number of occasions of AP CSI-RS resources or semi-persistent CSI-RS resources or static CSI-RS resources may be provided for a single CSI report. With those occasions of CSI-RS resources, the UE may be able to build a predictive model for the channel response and/or a predictive model for the precoder.

FIG. 1 illustrates an example antenna structure 100 for a base station in accordance with some embodiments. Regular antennas may be placed on a base station antenna array. In particular, the antenna structure 100 may be implemented within a base station (such as the gNB 1900 (FIG. 19)) as part of a base station antenna array.

The antenna structure 100 may include one or more antennas. The antennas may transmit signals at different antenna polarizations. For example, the illustrated antenna structure 100 may transmit signals with a first polarization (which may be referred to as "polarization 0") and a second polarization (which may be referred to as "polarization 1").

In particular, the antenna structure 100 shows a first antenna 102 with a first polarization (indicated by the solid line) and a second antenna 104 with a second polarization (indicated by the dotted line). The antenna structure 100 may include a one or more antennas with first polarization (indicated by the solid lines) and one or more antennas with second polarization (indicated by the dotted lines). In some embodiments, the second polarization may be orthogonal to the first polarization. While the first polarization and the second polarization are described as being generated by separate antennas, it should be understood that a single antenna may implement the two polarizations in other embodiments. Further, more polarizations may be implemented in other embodiments, where the polarizations may be implemented by a single antenna or different antennas.

One or more signals may be transmitted by the antennas of the antenna structure 100. Signals transmitted by antennas with the first polarization may be transmitted in the first polarization and signals transmitted by the antennas with the second polarization may be transmitted in the second polarization. One or more precoders may determine the phases and amplitudes for signals transmitted by the antennas. The precoders may be utilized for determining an amplitude of the signals transmitted by the antennas and/or which antennas are to transmit the signals. In some embodiments, the precoders may further be utilized to determine directions in which the signals are to be transmitted, such as in beamforming implementations. The precoders may be defined based on CSI feedback received from UEs. For example, a base station may receive CSI feedback from a UE and a may determine precoder values for precoders corresponding to the UE based on the CSI feedback, for example through signal to leakage ratio in some implementation. The base station may utilize the determined precoder values for the precoders for precoding signals to be transmitted to the UE.

A base station may determine precoder values for precoders for a UE based on equations for defining a codebook. For example, in legacy implementations, the base station may determine the precoder values for a spatial layer based on $$\begin{bmatrix} \sum_{p=0,b=1}^{B_0} A(\theta_{b,p},\phi_{b,p})C_{b,p}\delta(t-\tau_{b,p}) \\ \sum_{p=1,b=1}^{B_1} A(\theta_{b,p},\phi_{b,p})C_{b,p}\delta(t-\tau_{b,p}) \end{bmatrix},$$

where p is the polarization index (e.g. p=0 for polarization at +45° (which may be a first polarization) and p=1 for polarization at −45° (which may be a second polarization)), there are $B_0$ significant beams for transmission (Tx) antennas at polarization index 0, and $B_1$ significant beam for Tx antennas at polarization index 1. For polarization index p, b is the ray index for a ray (ray (p, b)) with departure angles $(\theta_{b,p}, \phi_{b,p})$, $A(\theta_{b,p}, \phi_{b,p})$ is the array response for $(\theta_{b,p}, \phi_{b,p})$, $\tau_{b,p}$ is the relative delay, and $a_p$ is the path gain including amplitude and phase for ray b. Assume regular antenna element arrangement, then $(\theta_{b,p}, \phi_{b,p})$ can be mapped to $(i_1, i_2, p_1, p_2)$, where $p_1$, $0 \leq p_1 \leq O_1-1$ and $p_2$, $0 \leq p_2 \leq O_2-1$ are oversampling factors for the vertical domain and the horizontal domain respectively, and $(i_1, i_2)$ are the spatial beam indices. $C_{b,p}$ is a complex coefficient connecting a spatial beam and a delay $\tau_{b,p}$ is a relative delay of ray (p, b) according to the reference receiver timing. The base station may apply the determined precoder values via precoders to signals transmitted by the base station to the UE.

The base station may determine the precoders for a layer for a UE based on CSI received from the UE. For example, precoders for a layer may be given by size-$P \times N_3$ matrix $W = W_1 \tilde{W}_2 W_f^H$, where $W_1$ is a spatial beam selection, $\tilde{W}_2$ is a bitmap design and quantizer design, and $W_f^H$ is a FD component selection. P may be equal to $2N_1N_2$, which may be equal to a number of spatial domain (SD) dimensions, $N_1$ is the number of antenna ports in one dimension (e.g. for the vertical domain, and $N_1=2$ for FIG. 2) and $N_2$ is the number of antenna ports in another dimension (e.g. for the horizon domain, and $N_2=4$ for FIG. 2). $N_3$ may be equal to a number of FD dimensions. Precoder normalization may be applied, where the precoder normalization may be defined by the precoding matrix for given rank and unit of $N_3$ is normalized to norm 1/sqrt(rank), where sqrt(rank) is the square root of a rank indicator.

SD selection/compression/quantization may be applied. L spatial domain basis vectors common for both polarizations (mapped to the two polarizations, so 2L spatial beams for both polarizations in total) may be selected. Compression/quantization in spatial domain using $$W_1 = \begin{bmatrix} v_0 v_1 \ldots v_{L-1} & 0 \\ 0 & v_0 v_1 \ldots v_{L-1} \end{bmatrix}$$

may be applied to select spatial beams associated with significant power, where $\{V_i\}_{i=0}^{L-1}$ are $N_1 N_2 \times 1$ orthogonal DFT vectors (same as Rel. 15 Type II).

FD selection/compression/quantization may be applied. Compression via $W_f = [f_{k_0} f_{k_1} \ldots f_{k_{M-1}}]$, where $\{f_{k_m}\}_{m=0}^{M-1}$ are M size-$N_3 \times 1$ orthogonal DFT vectors to select FD components with significant power for a spatial layer. Number of FD-components M may be configurable. L and M may be configured by gNB. In some embodiments, the FD compression unit may be determined by the number of CQI subbands and {PMI subband size=CQI subband size} as the default, and may be determined by {PMI subband size=CQI subband size/R} as a secondary choice. The value of R may be fixed to two. The FD compression unit parameter R may be higher-layered configured. The number of FD compression units, M, may be determined by $$M = \left\lceil p \times \frac{N_3}{R} \right\rceil$$

where $p \in \{\frac{1}{4}, \frac{1}{2}\}$. The value of M may be higher-layer configured, such as via R and p. The values for $N_3$ for $R \in \{1,2\}$ and $N_{SB}$ (the number of CQI subbands) may be determined by $N_3 = N_{SB} \times R$. $R \in \{1,2\}$ may be higher-layer configured.

Figure 2:
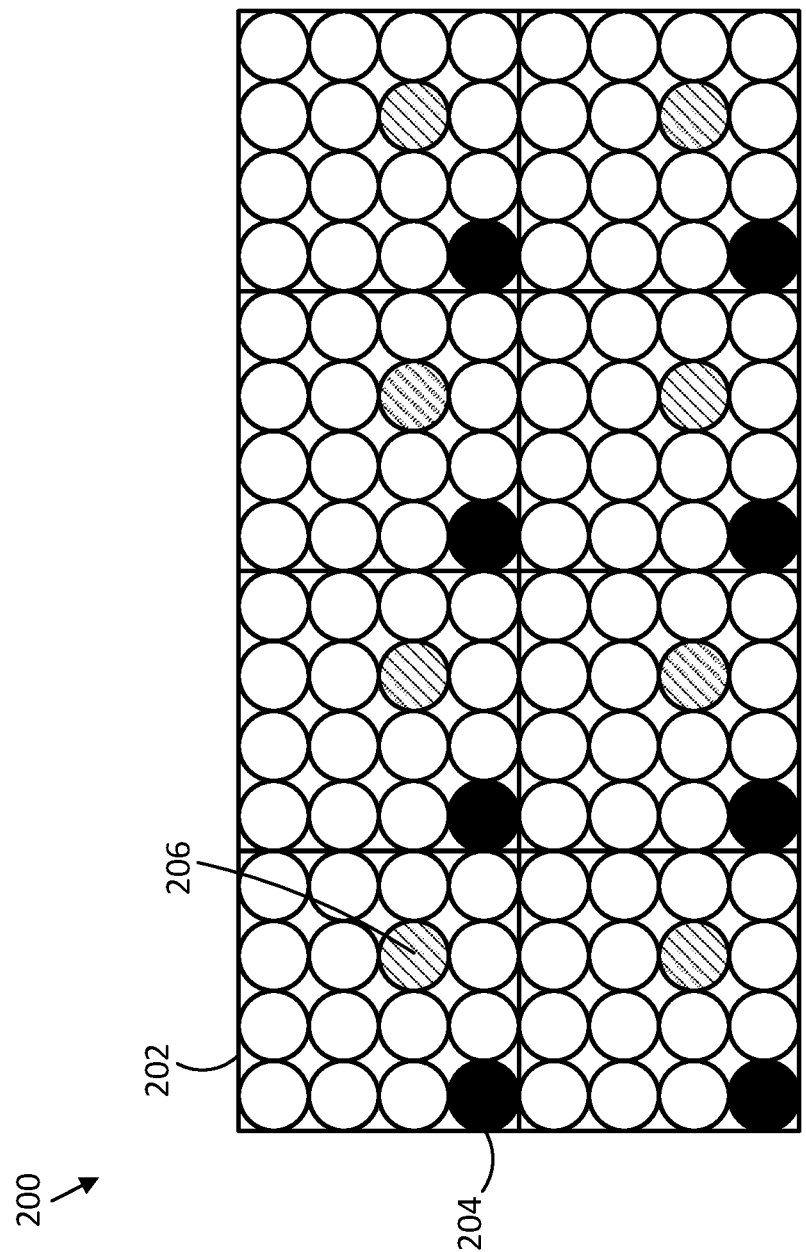
FIG. 2 illustrates example spatial beam selection representation in accordance with some embodiments.

FIG. 2 illustrates example spatial beam selection representation 200 in accordance with some embodiments. (i1,i2) may be used to choose the main direction of a spatial beam. (q1,q2) may be used to fine-tune the direction of the spatial beam. To ensure orthogonal bases, the same (q1,q2) may be used for all selected spatial beams.

The spatial beam selection representation 200 represents spatial beams that may be transmitted by one or more antennas. In particular, the spatial beam selection representation 200 may indicate spatial beams that may transmitted by the antennas of the antenna structure 100 (FIG. 1) in some embodiments. The spatial beams (represented by circles in the illustrated spatial beam selection representation 200) may be grouped (as indicated by the squares around the groups of spatial beams in the illustrated spatial beam selection representation 200) into groups of 16 spatial beams, where each of the groups may correspond to an antenna or paired antennas with two different polarizations. The (i1,i2) may indicate a selected group and (q1,q2) may indicate the particular spatial beam within the selected group.

The spatial beam selection representation 200 may include two groups in a first direction and four groups in a second direction, resulting in a two by four arrangement of groups. Each group may have four spatial beams in the first direction and four spatial beams in the second direction. For example, the spatial beam selection representation 200 may include a first group 202. The first group 202 may include 16 spatial beams in a four by four arrangement. The first group 202 may include an orthogonal discrete Fourier transform (DFT) beam 204, as indicated by the filled in circle in the spatial beam selection representation 200. The first group 202 may include a rotated DFT beam 206, as indicated by the circle with diagonal lines in the spatial beam selection representation 200. The rotated DFT beam 206 may have rotation factors of $q_1 = \frac{2}{4}$ and $q_2 = \frac{1}{4}$. In particular, the rotated DFT beam 206 may be rotated from the orthogonal DFT beam 204 by one spatial beam in the first direction and two spatial beams in the second direction. The unfilled circles of the first group 202 may comprise oversampled DFT beams. Each of the groups may have the same beam arrangement as the first group 202. In particular, the arrangement of the orthogonal DFT beams, the rotated DFT beams, and the oversampled DFT beams may be in the same positions relative to the groups as the orthogonal DFT beam 204, the rotated DFT beam 206, and the oversampled DFT beams within the first group 202 are relative to the first group. The positions of the beams being in the same relative positions in each of the groups may ensure orthogonal bases. It may be possible to select different spatial beams for different antenna polarizations.

Figure 3:
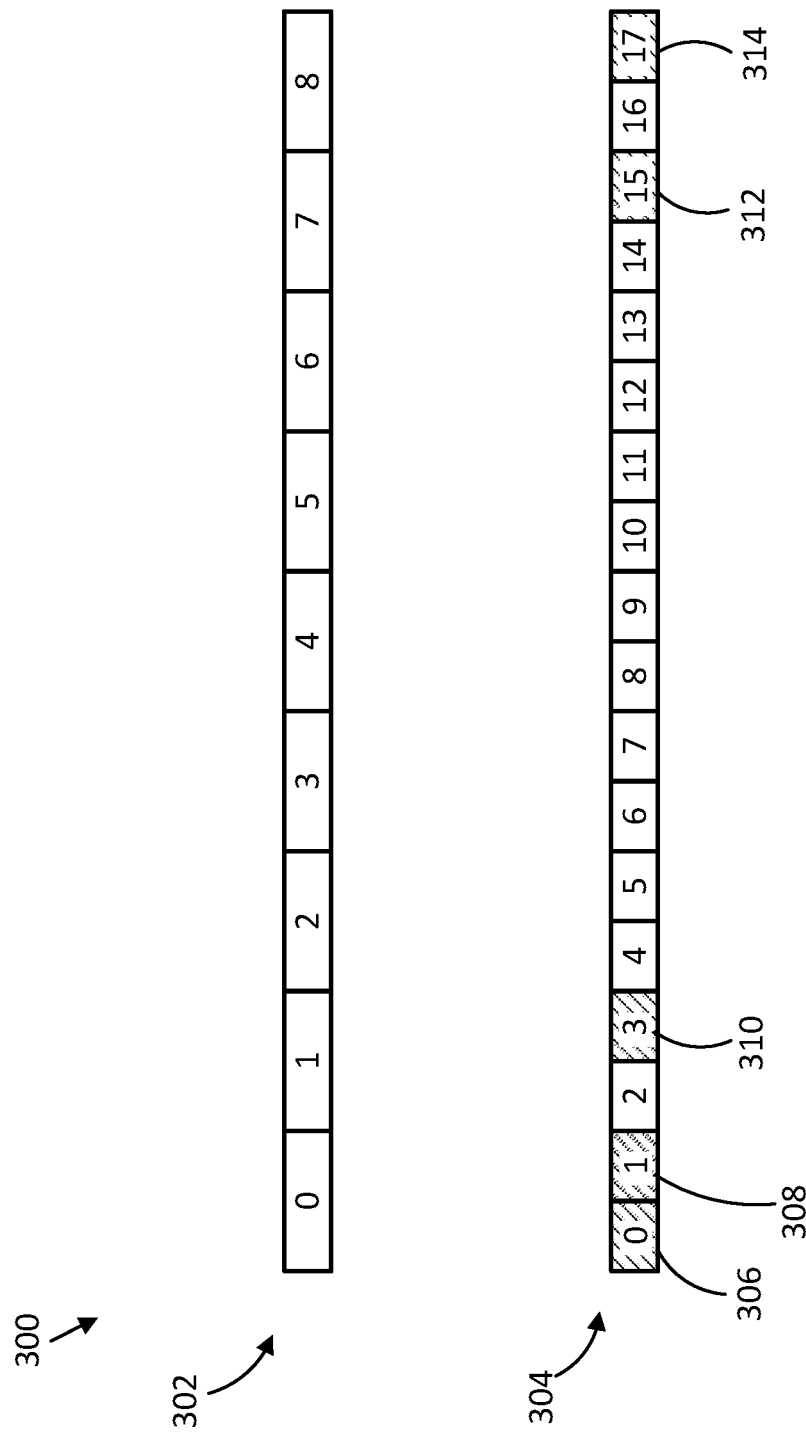
FIG. 3 illustrates an example frequency domain (FD) component selection arrangement in accordance with some embodiments herein.

FD component selection may be implemented by embodiments herein. FIG. 3 illustrates an example FD component selection arrangement 300 in accordance with some embodiments herein. FD components are the counterpart of delay taps. It is understood from wireless channel propagation, a power delay profile typically has a large initial tap (for non-line-of-sight (NLOS), the strongest tap may not be the earliest one).

The FD component selection arrangement 300 may include a number of configured CQI subbands 302, which may be represented by the symbol $N_{SB}$. For example, the FD component selection arrangement 300 includes nine configured CQI subbands in the illustrated embodiment. The configured CQI subbands, or some portion thereof, may be available to a UE (such as the UE 1800 (FIG. 18)) for transmission of CSI. For example, the UE may transmit CQI on one or more of the CQI subbands.

The configured CQI subbands 302 may be configured with a number of precoders per CQI subband, which may be represented by the symbol R. A number of precoder subbands may be determined based on the number of configured CQI subbands 302 and the number of precoders per CQI subband. For example, $N_3 = R \times N_{SB}$, where $N_3$ is the number of precoder subbands. The number of precoder subbands may define the number of taps in the time domain or the number of FD components. For example, the number of taps in the time domain or the number of FD components may be equal to the number of precoder subbands. The FD component selection arrangement 300 may include precoder subbands 304. The number of precoder subbands 304 may be defined based on the configured CQI subbands 302 and the number of precoders per CQI subband. For example, the precoder subbands 304 include 18 precoder subbands in the illustrated embodiment based on the number of configured CQI subbands 302 being nine configured CQI subbands and the number of precoders per CQI subband being two.

The UE may select a number of FD components, M, from the CQI subbands 302. The number of FD components selected by the UE may be based may be determined based on the number of precoders per CQI subband, the number of precoder subbands, and/or the number of configured CQI subbands 302. For example, $$M = \left\lceil p_v \times \frac{N_3}{R} \right\rceil.$$

The UE may be configured with a value $p_v$, where $v$ is a number of spatial layers (RI) for CSI feedback. In some embodiments, $v$ may be equal to 1, 2, 3, or 4. In the illustrated embodiment, $p_v \in \{1/8, 1/4, 1/2\}$. In the illustrated embodiment, the UE may select five FD components. In particular, the UE may select a first FD component 306, a second FD component 308, a third FD component 310, a fourth FD component 312, and a fifth FD component 314 (as illustrated by the FD components being illustrated with diagonal lines) from the precoder subbands 304 for the CSI feedback in the illustrated embodiment. In the illustrated embodiment, $N_{SB}$ is equal to nine, R is equal to two, $p_1$ is equal to $1/2$, $N_3$ is equal to 18, and M is equal to 5. The UE may report the selected FD components to a base station. In particular, the UE may transmit one or more signals to the base station that indicate the selected FD components.

Figure 4:
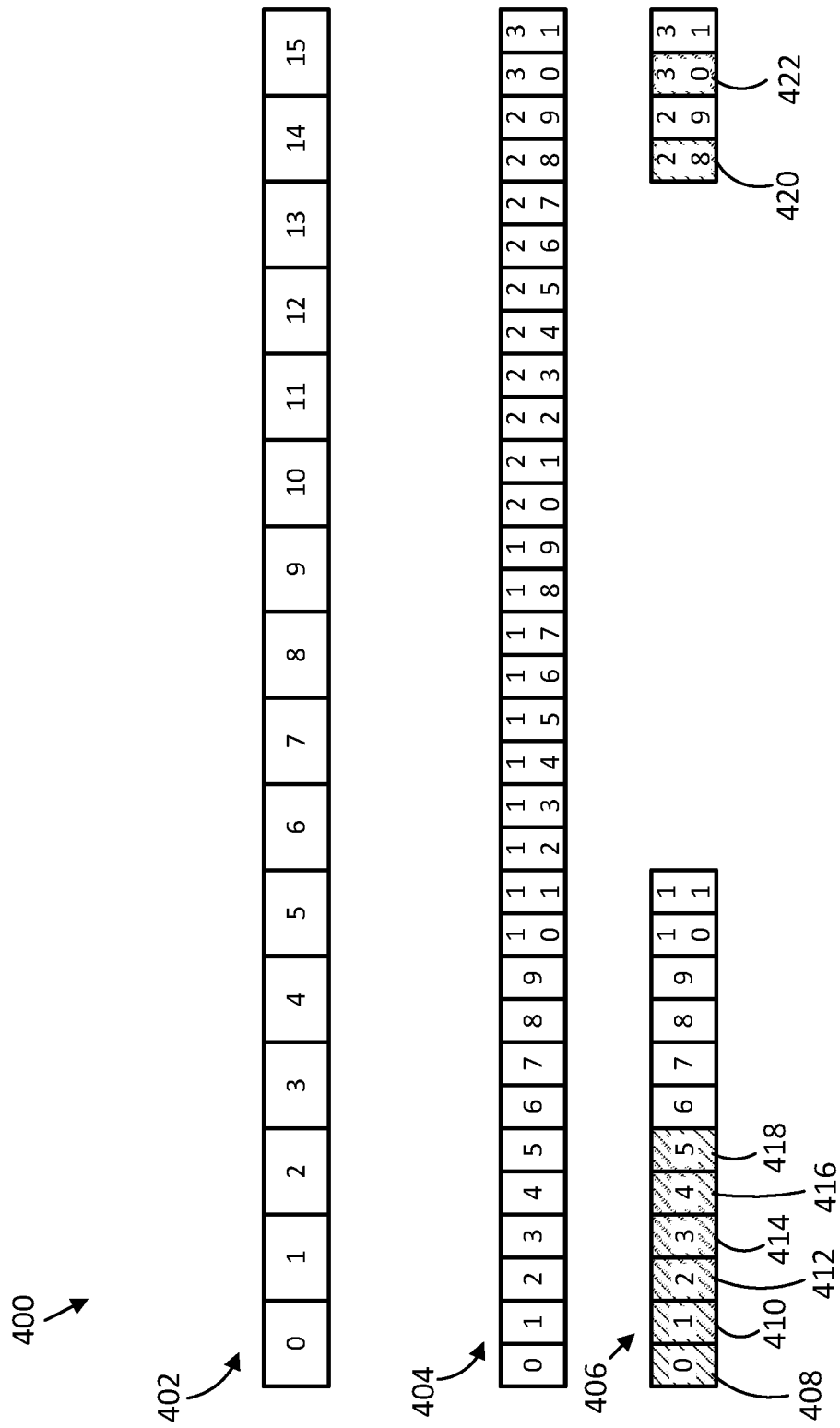
FIG. 4 illustrates another example FD component selection arrangement in accordance with some embodiments.

Due to signaling overhead consideration, a two stage FD component selection may be used when the number of taps is large. FIG. 4 illustrates another example FD component selection arrangement 400 in accordance with some embodiments. The FD component selection arrangement 400 illustrates a two stage FD component selection example.

The FD component selection arrangement 400 may include a number of configured CQI subbands 402, which may be represented by the symbol $N_{SB}$. For example, the FD component selection arrangement 400 includes 16 configured CQI subbands in the illustrated embodiment. The configured CQI subbands, or some portion thereof, may be available to a UE (such as the UE 1800 (FIG. 18)) for transmission of CSI. For example, the UE may transmit CQI on one or more of the CQI subbands.

The configured CQI subbands 402 may be configured with a number of precoders per CQI subband, which may be represented by the symbol R. A number of precoder subbands may be determined based on the number of configured CQI subbands 402 and the number of precoders per CQI subband. For example, $N_3 = R \times N_{SB}$, where $N_3$ is the number of precoder subbands. The number of precoder subbands may define the number of taps in the time domain or the number of FD components. For example, the number of taps in the time domain or the number of FD components may be equal to the number of precoder subbands. The FD component selection arrangement 400 may include precoder subbands 404. The number of precoder subbands 404 may be defined based on the configured CQI subbands 402 and the number of precoders per CQI subband. For example, the precoder subbands 404 include 32 precoder subbands in the illustrated embodiment based on the number of configured CQI subbands 402 being 16 configured CQI subbands and the number of precoders per CQI subband being two.

The UE may determine an intermediate set 406 from which to select the FD components, where the intermediate set (IntS) 406 may be a subset of the precoder subbands 404. The IntS 406 may be determined based on a number of FD components, M, to be selected by the UE. The number of FD components to be selected may be determined based on the number of precoders per CQI subband, the number of precoder subbands, and/or the number of configured CQI subbands 402. For example, $$M = \left\lceil p_v \times \frac{N_3}{R} \right\rceil.$$

The UE may be configured with a value $p_v$, where $v$ is a number of spatial layers (RI) for CSI feedback. In some embodiments, $v$ may be equal to 1, 2, 3, or 4. In the illustrated embodiment. $p_v \in \{1/8, 1/4, 1/2\}$. In the illustrated embodiment, the UE may select eight FD components. The IntS 406 may comprise a set of $N_3'$ FD bases, where $N_3' = 2 \times M$. The IntS 406 may be defined by mod ($M_{initial} + n$, $N_3$), where n=0, 1, . . . , $N_3'$−1. $M_{initial}$ may be selected by the UE and may be reported to a base station in uplink control information (UCI) part 2. $M_{initial}$ may be selected from a set, where the set is $M_{initial} \in \{-(N_3'-1), -(N_3'-2), \ldots, -1, 0\}$.

The FD component selection arrangement 400 shows the IntS 406 from the precoder subbands 404. In the illustrated embodiment, $M_{initial}$ is −4. Accordingly, the IntS 406 may extend from precoder subband index 28 to precoder subband index 11. The UE may select the eight FD components from the IntS 406. In particular, the UE may select a first FD component 408, a second FD component 410, a third FD component 412, a fourth FD component 414, a fifth FD component 416, a sixth FD component 418, a seventh FD component 420, and an eighth FD component 422 (as illustrated by the FD components being illustrated with diagonal lines) from the IntS 406 for the CSI feedback in the illustrated embodiment. In the illustrated embodiment, $N_{SB}$ is equal to 16, R is equal to two, $p_1$ is equal to $1/2$, $N_3$ is equal to 32, M is equal to 8, and $N_3'$ is equal to 16. The UE may report the selected FD components to a base station. In particular, the UE may transmit one or more signals to the base station that indicate the selected FD components.

Figure 5:
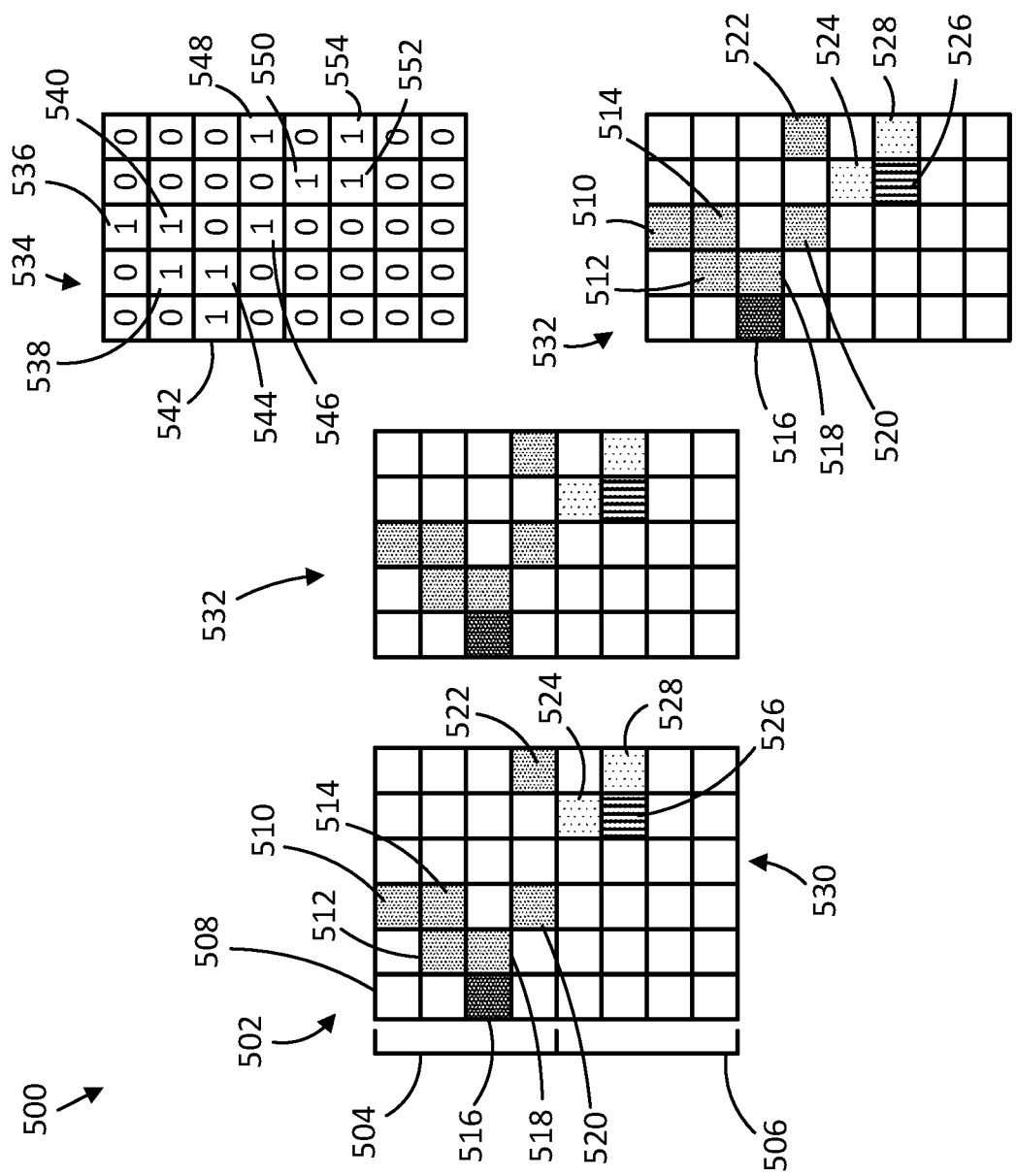
FIG. 5 illustrates a first portion of an example bitmap generation flow in accordance with some embodiments.

FIG. 5 illustrates a first portion of an example bitmap generation flow 500 in accordance with some embodiments. The bitmap generation flow 500 illustrates an example flow that may be performed by a UE (such as the UE 1800 (FIG. 18)) to generate a bitmap of LC coefficient indications for reporting CSI to a base station. The UE implementing the flow of the bitmap generation flow 500 may reduce the data to be transmitted for a bitmap as compared to simplistic bitmaps, for example, by being allowed to select different spatial beams for different antenna polarizations.

The bitmap generation flow 500 may include a bitmap 502 for LC coefficients as determined based on measurements by the UE. In particular, the bitmap 502 may indicate values of LC coefficients for signals received from a base station that were measured by the UE. The UE may generate the bitmap 502 based on the determined values of the LC coefficients. Each square of the bitmap 502 may indicate an LC coefficient of signals measured by the UE. An x-axis of the bitmap 502 is for FD-components of the LC coefficients and a y-axis of the bitmap 502 is for selected spatial beams, where each square in the bitmap corresponds to an index of the FD component and an index of the spatial beams. In the illustrated embodiment, the bitmap 502 includes eight selected spatial beams for two antenna polarizations and six FD components. The spatial beams of the bitmap 502 may be divided into a first polarization 504 and a second polarization 506. In particular, the spatial beams corresponding to the top four rows of the bitmap 502 may have the first polarization 504 and the spatial beams corresponding to the bottom four rows of the bitmap 502 may have the second polarization 506.

In the bitmap 502, the boxes that are unfilled indicate that the amplitude of the LC coefficient for the corresponding spatial beam and frequency component is zero. In particular, the UE may have determined that the amplitude of the LC coefficients corresponding to the unfilled boxes is equal to zero. For example, an LC coefficient of a first coefficient 508 has an amplitude of zero in the illustrated embodiment. It should be understood that referring to having an amplitude of zero may not necessarily mean the amplitude of the LC coefficient is precisely zero in some embodiments, but the amplitude of the LC coefficient is within a predefined range of zero in these embodiments. Further, non-zero amplitude in these embodiments may refer to the amplitude of the LC coefficient being larger than the predefined range for zero.

In the bitmap 502, the boxes with fills indicate that the amplitude of the LC coefficient for the corresponding spatial beam and the frequency component is non-zero. In particular, the UE may have determined that the amplitude of the LC coefficients to be non-zero. For example, the UE may have determined that the second coefficient 510, the third coefficient 512, the fourth coefficient 514, the fifth coefficient 516, the sixth coefficient 518, the seventh coefficient 520, the eighth coefficient 522, the ninth coefficient 524, the tenth coefficient 526, and the eleventh coefficient 528 have amplitudes that are non-zero. As can be seen from the bitmap, the second coefficient 510 through the eighth coefficient 522 have the first polarization 504 and the ninth coefficient 524 through the eleventh coefficient 528 have the second polarization 506.

The UE may determine whether any of the FD components of the bitmap 502 are without any non-zero LC coefficient values. For example, the UE may determine an FD component 530 corresponding to the fourth column in the bitmap 502 does not include any LC coefficients with non-zero amplitudes. Based on the UE determining that an FD component does not include any LC coefficients with non-zero amplitudes, the UE may remove the FD component from the bitmap 502 to produce a modified bitmap. In particular, the UE may remove the column corresponding to the FD component from the bitmap 502 causing the modified bitmap to be smaller than the bitmap 502. In the illustrated embodiment, the UE may remove the FD component 530 to produce a modified bitmap 532 without the FD component. As part of removing an FD component 530, the UE may not report the values of the LC coefficients within the FD component 530. In contrast, the UE may include an indication of the FD component that has been removed from bitmap 502 in a report rather than the values of each of the LC coefficients in the FD component, which may result in less bits being include in the report and less overhead. In addition or alternatively the UE may indicate a subset of selected 2L spatial beams to reduce the size of the bitmap. The modified bitmap 532 may maintain the rest of the FD components and the LC coefficient values from the bitmap 502.

For understanding, the illustrated bitmap generation flow 500 includes a non-zero indication bitmap 534. The non-zero indication bitmap 534 may indicate which components of the modified bitmap 532 have non-zero values and which components of the modified bitmap have zero values. In particular, the non-zero indication bitmap 534 indicates a '1' in component locations for LC coefficients with non-zero values and a '0' in component locations for LC coefficients with zero values. In the illustrated example, the non-zero indication bitmap 534 has a first coefficient 536, a second coefficient 538, a third coefficient 540, a fourth coefficient 542, a fifth coefficient 544, a sixth coefficient 546, a seventh coefficient 548, an eighth coefficient 550, a ninth coefficient 552, and a tenth coefficient 554 that indicate a '1' based on the corresponding LC coefficients being non-zero values. The rest of the components of the non-zero indication bitmap 534 may indicate a '0' based on the corresponding LC coefficients being zero values. The first coefficient 536 of the non-zero indication bitmap 534 corresponds to second coefficient 510 from the modified bitmap 532, the second coefficient 538 of the non-zero indication bitmap 534 corresponds to the third coefficient 512 of the modified bitmap 532, the third coefficient 540 of the non-zero indication bitmap 534 corresponds to the fourth coefficient 514 of the modified bitmap 532, the fourth coefficient 542 of the non-zero indication bitmap 534 corresponds to the fifth coefficient 516 of the modified bitmap 532, the fifth coefficient 544 of the non-zero indication bitmap 534 corresponds to the sixth coefficient 518 of the modified bitmap 532, the sixth coefficient 546 of the non-zero indication bitmap 534 corresponds to the seventh coefficient 520 of the modified bitmap 532, the seventh coefficient 548 of the non-zero indication bitmap 534 corresponds to the eighth coefficient 522 of the modified bitmap 532, the eighth coefficient 550 of the non-zero indication bitmap 534 corresponds to the ninth coefficient 524 of the modified bitmap 532, the ninth coefficient 552 of the non-zero indication bitmap 534 corresponds to the tenth coefficient 526 of the modified bitmap 532, and the tenth coefficient 554 of the non-zero indication bitmap 534 corresponds to the eleventh coefficient 528 of the modified bitmap 532.

Figure 6:
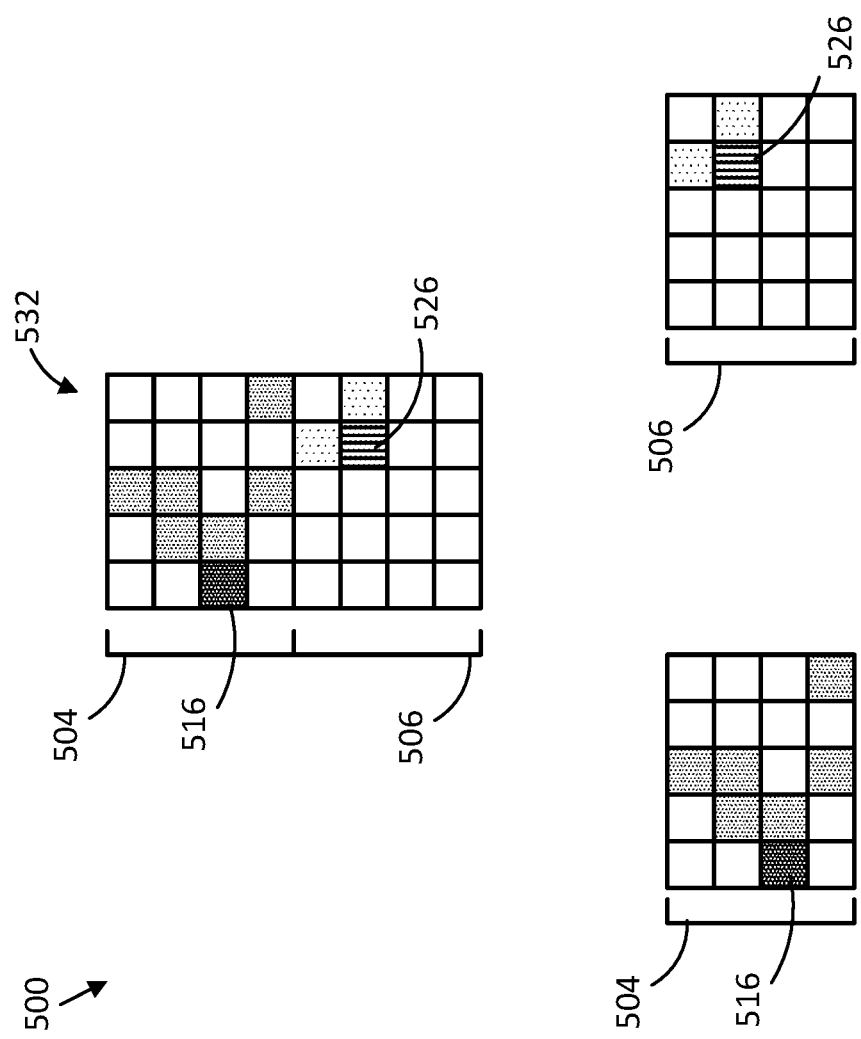
FIG. 6 illustrates a second portion of the example bitmap generation flow in accordance with some embodiments.

FIG. 6 illustrates a second portion of the example bitmap generation flow 500 in accordance with some embodiments. For example, the second portion of the example bitmap generation flow 500 may proceed with the modified bitmap 532 produced from the first portion of the example bitmap generation flow 500. For each polarization, the UE may identify a reference, and the stronger one may be used by the UE to normalize all the LC coefficients.

The UE may determine a strongest LC coefficient from the LC coefficients included in the modified bitmap 532. In particular, the UE may determine the LC coefficient with the largest amplitude included in the modified bitmap 532. In the illustrated embodiment, the UE may determine that the fifth coefficient 516 is the strongest LC coefficient based on the fifth coefficient 516 having the largest amplitude of the LC coefficients included in the modified bitmap 532.

The UE may further determine which polarization includes the strongest LC coefficient. For example, the UE may determine whether the strongest LC coefficient has the first polarization 504 or the second polarization 506 in the illustrated embodiment. In the illustrated embodiment, the UE may determine that the fifth coefficient 516 has the first polarization 504.

The UE may further determine the strongest LC coefficient from the other polarizations that do not include the strongest LC coefficient of the entire modified bitmap 532.

For example, as the UE determined that the strongest LC coefficient in the illustrated embodiment has the first polarization 504, the UE may determine which LC coefficient having the second polarization 506 has the largest amplitude. In the illustrated embodiment, the UE may determine that the tenth coefficient 526 has the strongest LC coefficient of the LC coefficients with the second polarization 506.

The UE may normalize the non-zero LC coefficients of the modified bitmap 532 based on the strongest LC coefficient of the modified bitmap 532. In particular, the UE may divide the value of all the LC coefficients having non-zero amplitudes by the value of the strongest LC coefficient in the modified bitmap 532. For example, the UE may divide the values of the non-zero LC coefficients of the modified bitmap 532 by the value of the fifth coefficient 516 to normalize the non-zero LC coefficients.

The UE may perform a high resolution amplitude quantization with the LC coefficients within the modified bitmap 532. For example, the UE may take the normalized values for the LC coefficients within the modified bitmap 532 and quantize the normalized values to selected digital values. In some embodiments, the high resolution amplitude quantization may be performed with four bits. The alphabet for the high resolution amplitude quantization may be $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}$$

in some embodiments, where the step size may be −1.5 decibels (dB). Each of the normalized values for the LC coefficients may be converted to the corresponding closest values from the alphabet for the high resolution amplitude quantization.

The UE may perform normal resolution amplitude quantization and/or phase quantization with the LC coefficients with the first polarization 504. In particular, the UE may divide the LC coefficients into LC coefficients with the first polarization 504 and LC coefficients with the second polarization 506. The UE may perform normal resolution amplitude quantization with the LC coefficients with the first polarization 504. The normal resolution amplitude quantization may be performed with three bits in some embodiments. In some embodiments, the alphabet for the normal resolution amplitude quantization may be $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\},$$

where the step size may be −3 decibels (dB). Each of the values for the LC coefficients may be converted to the corresponding closest values from the alphabet for the normal resolution amplitude quantization. For example, the LC coefficients may be converted from the high resolution amplitude quantization values to the corresponding closest values from the normal resolution amplitude quantization.

The UE may perform phase quantization with the LC coefficients with the first polarization 504. In particular, the UE may perform phase quantization to indicate the phase of the LC coefficients in the first polarization 504. In some embodiments, the phase quantization may be performed with four bits. For example, the UE may perform phase quantization with the LC coefficients with the first polarization 504 to 16 phase shift keying (PSK) in some embodiments. The phase may be based on an FD component of the strongest LC in the polarization. In the illustrated embodiments, the strongest LC for the first polarization 504 may be the fifth coefficient 516, which is in the first FD component of the modified bitmap 532 and has a phase of zero. As the phase in the illustrated embodiment of the first polarization 504 is zero, the phase quantization would result in the phase value of the first polarization 504 being zero. Accordingly, the phase quantization may be skipped in the illustrated embodiment since the phase value for the fifth coefficient 516 would be the same before and after the phase quantization.

The UE may perform normalization, normal resolution amplitude quantization, and/or phase quantization for the LC coefficients of the second polarization 506. In particular, the UE may normalize the LC coefficients of the second polarization 506 with the strongest LC coefficient of the second polarization 506. For example, the UE may divide the values of the LC coefficients with the second polarization 506 by the value of the strongest LC coefficient to normalize the values of the LC coefficients of the second polarization 506. In the illustrated embodiments, the strongest LC coefficient of the second polarization 506 may be the tenth coefficient 526. The UE may normalize the LC coefficients with the second polarization 506 by dividing the values of the LC coefficients by the value of the tenth coefficient 526.

The UE may perform normal resolution amplitude quantization with the LC coefficients with the second polarization 506. The normal resolution amplitude quantization may be performed with three bits in some embodiments. In some embodiments, the alphabet for the normal resolution amplitude quantization may be $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\},$$

where the step size may be −3 dB. Each of the values for the LC coefficients may be converted to the corresponding closest values from the alphabet for the normal resolution amplitude quantization. For example, the LC coefficients may be converted from the high resolution amplitude quantization values to the corresponding closest values from the normal resolution amplitude quantization.

The UE may perform phase quantization with the LC coefficients with the second polarization 506. In particular, the UE may perform phase quantization to indicate the phase of the LC coefficients in the second polarization 506. In some embodiments, the phase quantization may be performed with four bits. For example, the UE may perform phase quantization with the LC coefficients with the first polarization 504 to 16PSK in some embodiments. The phase may be based on an FD component of the strongest LC in the polarization. In the illustrated embodiments, the strongest LC for the second polarization 506 may be the tenth coefficient 526, which is in the fourth FD component of the modified bitmap 532. The UE may perform the phase quantization with the phase from the tenth coefficient 526.

Figure 7:
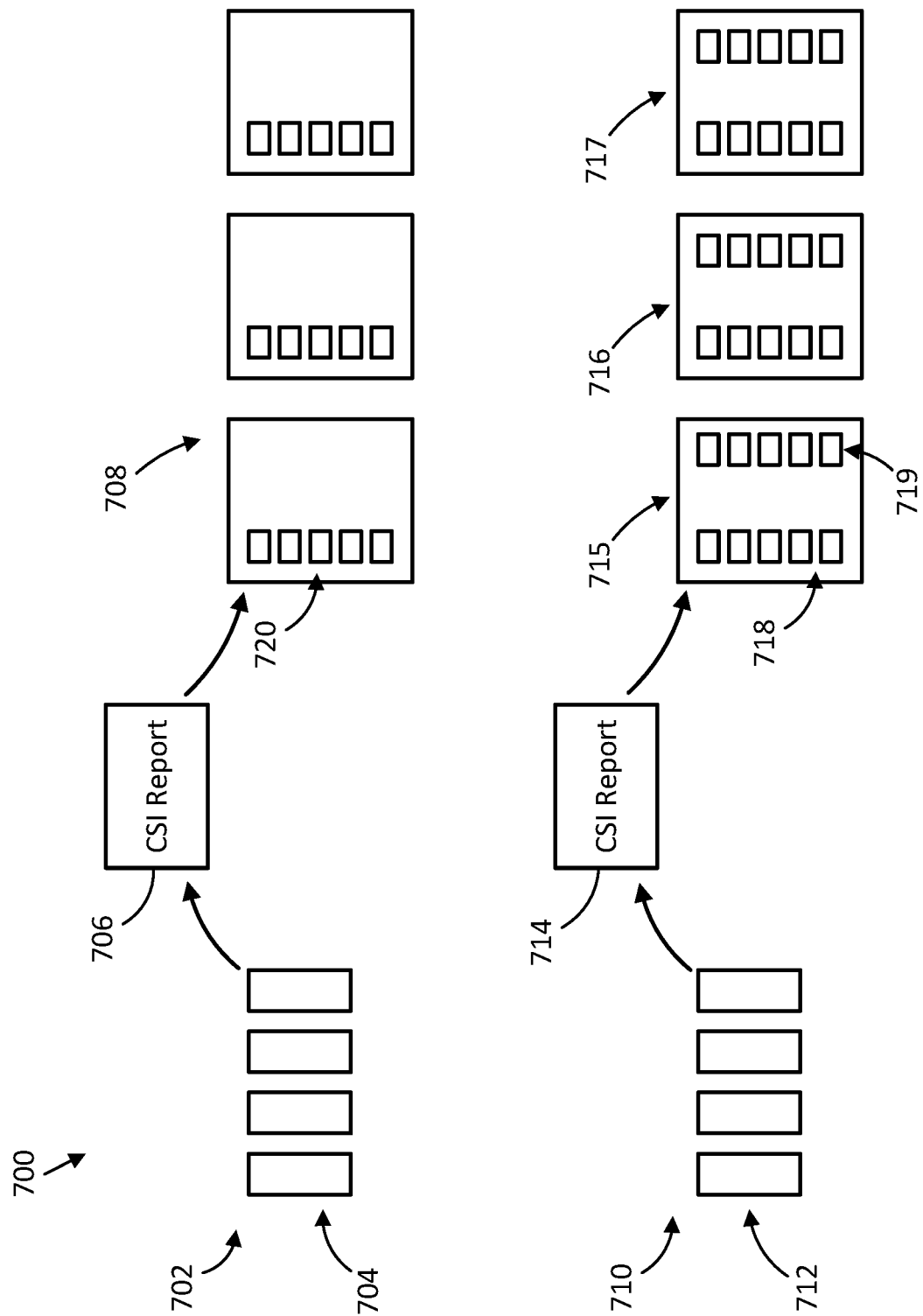
FIG. 7 illustrates example channel state information (CSI) report approaches in accordance with some embodiments.

FIG. 7 illustrates example CSI report approaches 700 in accordance with some embodiments. The CSI report approaches 700 may indicate approaches for CSI reporting and precoder generation in accordance with some embodiments.

The CSI report approaches 700 may include a first CSI report approach 702. The first CSI report approach 702 may have a single precoder for all the OFDM symbols in a PDSCH. In the first CSI report approach 702, a UE (such as the UE 1800 (FIG. 18)) may perform measurements of a plurality of CSI measurement resources 704. For example, the UE may perform measurements of four CSI measurement resources 704. Based on the measurements of the CSI measurement resources 704, the UE may perform the bitmap generation in accordance with the bitmap generation flow 500 (FIG. 5) with the resultant measurement of the CSI measurement resources 704.

The UE may generate a CSI report 706 based on the measurements of the CSI measurement resources 704. For example, the UE may generate the CSI report 706 with RI, CQI, and PMI based on the measurements of the CSI measurement resources 704. In some embodiments, the RI, CQI, and/or PMI within the CSI report 706 generated by the UE may be predicative, such that the UE may produce values built on a predictive model for the channel response and/or a predictive model for the precoder. In particular, the UE may produce values for the RI, CQI, and/or PMI that are predictive for channel responses and/or precoders that may occur within a future time period. The UE may transmit the CSI report 706 to a base station (such as the gNB 1900 (FIG. 19)). In some embodiments, the CSI report 706 may omit a CSI-reference signal (RS) resource indicator (CRI).

The base station may generate one or more precoders for a plurality of OFDM symbols within a PDSCH based on the CSI report 706. In the first CSI report approach 702, the base station may generate a single precoder for multiple portions on the PDSCH. In the illustrated embodiment, the base station may generate a single precoder from the CSI report 706 to be utilized for each of the three occasions 708, and in total three precoders are generated for three PDSCH occasions. Each occasion 708 may include one or more subbands 720, where the precoder may have subband precoders, which may be utilized for the subbands 720. In the illustrated embodiment of the first CSI report approach 702, each occasion 708 includes five subbands 720, where the precoder with five subband precoders is utilized for the five subbands. Accordingly, the base station may utilize the precoder for signals transmitted within the subbands of the occasion 708. Generating the precoders for the multiple occasions of the PDSCH from a single CSI report rather than having a single CSI report for each occasion and/or subband may reduce the number of CSI reports transmitted during operation of the UE and base station, thereby reducing overhead between the UE and the base station.

The CSI report approaches 700 may include a second CSI report approach 710. The second CSI report approach 710 may have multiple precoders at a given subband for multiple portions in a PDSCH. In the second CSI report approach 710, a UE (such as the UE 1800 (FIG. 18)) may perform measurements of a plurality of CSI measurement resources 712. For example, the UE may perform measurements of four CSI measurement resources 712. Based on the measurements of the CSI measurement resources 712, the UE may perform the bitmap generation in accordance with the bitmap generation flow 500 with the resultant measurement of the CSI measurement resources 712.

The UE may generate a CSI report 714 based on the measurements of the CSI measurement resources 712. For example, the UE may generate the CSI report 714 with RI, CQI, and PMI based on the measurements of the CSI measurement resources 712. In some embodiments, the RI, CQI, and/or PMI within the CSI report 714 generated by the UE may be predicative, such that the UE may produce values built on a predictive model for the channel response and/or a predictive model for the precoder. In particular, the UE may produce values for the RI, CQI, and/or PMI that are predictive for channel responses and/or precoders that may occur within a future time period. The UE may transmit the CSI report 714 to a base station (such as the gNB 1900 (FIG. 19)). In some embodiments, the CSI report 714 may omit a CSI-reference signal (RS) resource indicator (CRI).

The base station may generate one or more precoders for a plurality of OFDM symbols within a PDSCH based on the CSI report 714. In the second CSI report approach 710, the base station may generate multiple precoders at a given subband for multiple portions in the PDSCH. In the illustrated embodiment, the base station may generate two precoders from the CSI report 714 to be utilized for two portions (for example, a first portion 718 and a second portion 719 for first occasion) in a second occasion 716. Each of the first occasion 715, the second occasion 716, and a third occasion 717 may include one or more subbands. In the illustrated embodiment of the second CSI report approach 710, each of the first occasion 715, the second occasion 716, and the third occasion 717 includes two portions with five subbands for each portion for a total of ten subbands for each occasion. The base station may apply the first precoder which has five subband precoders to the five subbands at the first portion 718 and the second precoder which has five subband precoders to the five subbands at the second portion 719. In some embodiments, the base station may apply a precoder to a first PDSCH occasion 715 within a period of time of receipt of the CSI report and apply a precoder to a last PDSCH occasion after the period of time of receipt of the CSI report until another CSI report is received by the base station. Generating the precoders for the multiple occasions of the PDSCH from a single CSI report rather than having a single CSI report for each occasion/portion and/or subband may reduce the number of CSI reports transmitted during operation of the UE and base station, thereby reducing overhead between the UE and the base station.

A precoder may be represented by equations that define the precoders for each of the polarization. For example, a base station may generate precoders for each polarization, where the precoders may be represented by equations. For example, the precoders generated by the base station may be represented by $$\begin{bmatrix} \sum_{p=0,b=1}^{B_0} A(\theta_{b,p}, \phi_{b,p}) C_{b,p} e^{2\pi f_{b,p} t} \delta(t-\tau_{b,p}) \\ \sum_{p=1,b=1}^{B_1} A(\theta_{b,p}, \phi_{b,p}) C_{b,p} e^{2\pi f_{b,p} t} \delta(t-\tau_{b,p}) \end{bmatrix},$$

where the top equation may represent the precoder for a first polarization from which subband precoders can be generated and the bottom equation may represent the precoder for a second polarization from which subband precoders can be generated. The equations may include a term $f_{b,p}$ for Doppler shift that may be presented due to a UE that is moving and/or a base station that is moving, or changing propagation environment (for example, a reflector is moving). $(\theta_{b,p}, \phi_{b,p})$ may define a ray at departure angles $\theta_{b,p}$ and $\phi_{b,p}$, $A(\theta_{b,p}, \phi_{b,p})$ may be an array response for the beam, $C_{b,p}$ may be a complex coefficient connecting a spatial beam, a relative delay, and the Doppler shift for the ray, and $\tau_{b,p}$ may be a delay for the ray.

The equation can be modified to take into account normalization based on the strongest LC coefficient and shift of the frequency offset applied to the LC coefficients. For example, the strongest LC coefficient, $C_{\hat{b},\hat{p}}$, associated with the polarization index $\bar{p}$ and the ray index $\hat{b}$ may be factored into the equation, along with a frequency $f_{\hat{b},\bar{p}}$ of the strongest LC coefficient which can be used to shift the frequency offset at LC coefficients. The equations may become $$\begin{bmatrix} \sum_{p=0,b=1}^{B_0} A(\theta_{b,p}, \phi_{b,p}) \frac{C_{b,p}}{C_{\hat{b},\bar{p}}} e^{2\pi\left(f_{b,p}-f_{\hat{b},\bar{p}}\right)t} \\ \delta\left(t - \left(\tau_{b,p} - \tau_{\hat{b},\bar{p}}\right)\right) \\ \sum_{p=1,b=1}^{B_1} A(\theta_{b,p}, \phi_{b,p}) \frac{C_{b,p}}{C_{\hat{b},\bar{p}}} e^{2\pi\left(f_{b,p}-f_{\hat{b},\bar{p}}\right)t} \\ \delta\left(t - \left(\tau_{b,p} - \tau_{\hat{b},\bar{p}}\right)\right) \end{bmatrix},$$

where $C_{\hat{b},\bar{p}}$ may be a strongest LC coefficient, $(f_{b,p}-f_{\hat{b},\bar{p}})$ may be a (relative) frequency offset, and $(\tau_{b,p}-\tau_{\hat{b},\bar{p}})$ may be a relative delay. $\tau_{\hat{b},\bar{p}}$ may be a time delay of the strongest LC coefficient and may be utilized to shift the LC coefficients. The $\tau_{\hat{b},\bar{p}}$ may be used to shift the strongest LC coefficient to the first FD component (or the first tap).

To control the feedback overhead, only larger $$\frac{C_{b,p}}{C_{\hat{b},\bar{p}}}$$

and the corresponding $(\theta_{b,p},\phi_{b,p})$, $\Delta f_{b,p}=f_{b,p}-f_{\hat{b},\bar{p}}$ and $\Delta\tau_{b,p}=\tau_{b,p}-\tau_{\hat{b},\bar{p}}$ may be fed back from the UE to the base station. Conceptually, it can be seen that if $$\frac{C_{b,p}}{C_{\hat{b},\bar{p}}}$$

is small, omitting $$\frac{C_{b,p}}{C_{\hat{b},\bar{p}}}$$

and corresponding quantities does not amount to too much of a difference in the resulting precoder. If feedback overhead is not an issue, then feeding back $\theta_{b,p}$, $\phi_{b,p}$, $$\frac{C_{b,p}}{C_{\hat{b},\bar{p}}},$$

$(f_{b,p}-f_{\hat{b},\bar{p}})$, $(\tau_{b,p}-\tau_{\hat{b},\bar{p}})$ may be possible. Since feedback overhead in many cases is a concern, then quantizations applied to those quantities may be used. The quantizations corresponding to the quantities may be denoted as spatial beam selection and quantization $Q_{1,1}$ and $Q_{1,2}$, delay tap (which may also be referred to as FD component) quantization $Q_2$, LC coefficient quantization $Q_3$, and Doppler component (which may be referred to as Time-Domain component or TD component) selection/quantization $Q_4$. The equations may then become $$\begin{bmatrix} \sum_{p=0,b=1}^{B_0} A(Q_{1,1}\theta_{b,p}), Q_{1,2}(\phi_{b,p})Q_3\left(\frac{C_{b,p}}{C_{\hat{b},\bar{p}}}\right) e^{2\pi Q_4\left(f_{b,p}-f_{\hat{b},\bar{p}}\right)t} \\ \delta\left(t - Q_2\left(\tau_{b,p} - \tau_{\hat{b},\bar{p}}\right)\right) \\ \sum_{p=1,b=1}^{B_1} A\left(Q_{1,1}(\theta_{b,p}), Q_{1,2}(\phi_{b,p})Q_3\left(\frac{C_{b,p}}{C_{\hat{b},\bar{p}}}\right) e^{2\pi Q_4\left(f_{b,p}-f_{\hat{b},\bar{p}}\right)t}\right) \\ \delta\left(t - Q_2\left(\tau_{b,p} - \tau_{\hat{b},\bar{p}}\right)\right) \end{bmatrix}$$

with the quantizations in place of the quantities.

Figure 9:
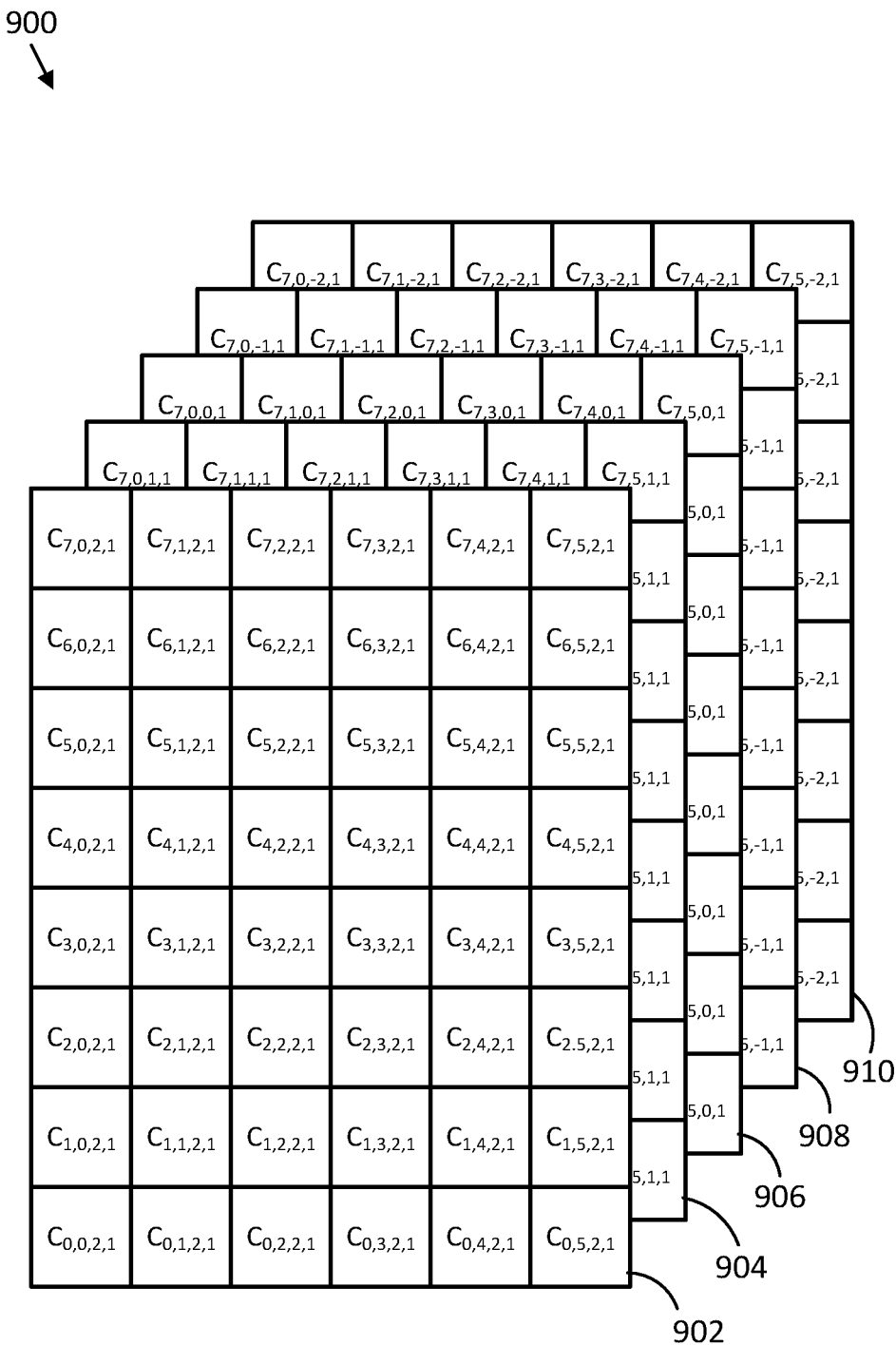
FIG. 9 illustrates a portion of codebook with multiple sheets in accordance with some embodiments.

The approaches described herein may address one or more design challenges presented by legacy systems. For example, embodiments described herein may address challenges with codebook structure and/or spatial beam, FD component, and/or TD component selection. A "sheet" can be used to refer to LC coefficients associated with the same quantized Doppler component as shown in FIG. 9, where five Doppler frequency offsets are shown (alternatively five "sheets" are shown) The challenges may be addressed through sheet selection and/or component selection described throughout this disclosure. In some embodiments, the UE may provide report on selected Doppler frequency offsets or selected Doppler sheets. In some embodiments, sheet-common reporting may be implemented where the UE reports spatial beam selection and/or FD component selection to the base station to address the challenges. Further, sheet-specific reporting may be implemented in some embodiments where the UE reports the spatial beam selection per sheet and/or the FD component selection per sheet.

Embodiments described herein may further address the challenge of non-zero LC coefficient selection. For example, the challenge may be addressed through consolidated bitmap and TD component signaling, which may provide efficient encoding of Doppler components. Further, the challenge may be addressed via bitmap per sheet design.

Embodiments described herein may further address the challenge of non-zero LC coefficient quantization. For example, the challenge may be addressed through fixed quantization design, quantization design with parameters that are selectable by the UE and/or configurable by the base station, and/or UE-defined quantizer with standardized interface. These approaches may provide for two stage quantization with various choices for references. Further, the challenge may be addressed through quantizer version selection.

An approach described herein may implement a codebook structure that takes into account TD components. For example, base stations (such as the gNB 1900 (FIG. 19)) and/or UEs (such as the UE 1800 (FIG. 18)) may implement a codebook structure that takes into account a TD component selection for precoding signals exchanged between the base stations and the UEs.

In some embodiments, the codebook structure implemented by the base stations and/or the UEs may be determined based on $W=W_1(\tilde{W}_2 W_d(t,:)^H)W_f^H$ or it can be formulated in another way as $W=W_1(\tilde{W}_{2_x}^3 W_d(t,:)^H)_x^2 W_f^H$ at spatial layer n. $W_1$ may be a spatial beam selection, $\tilde{W}_2$ may be a non-zero LC coefficient selection and quantization, $W_d$ may be a TD component selection, $$W_d = \begin{bmatrix} f_{k'_0} f_{k'_1} & \cdots & f_{k'_{M_d-1}} \end{bmatrix},$$

where $\{f_{k'_d}\}_{d=0}^{M_d-1}$ and $M_d$ size-$N_4 \times 1$ orthogonal DFT vectors to select TD components with significant power at a spatial layer, and $W_f^H$ may be the FD component selection, $W_f = [f_{k_0} \; f_{k_1} \; \ldots \; f_{k_{M-1}}]$, where $\{f_{k_m}\}_{m=0}^{M-1}$ are M size-$N_3 \times 1$ orthogonal DFT vectors to select FD components with significant power for sheets at a spatial layer. Further, P may equal $2N_1N_2$, which may equal a number of SD dimensions. $N_3$ may be equal to a number of FD dimensions. $N_4$ may be equal to a number of time domain dimensions (the maximum number of time units between the CSI report and the predicted precoder for PDSCH in the latest valid time unit). $\tilde{W}_2$ is a 3D matrix of dimensions $2L \times M \times M_d$ for linear combination coefficients. At spatial layer n, $\tilde{W}_2(l, m, f) = C_{l,m,f,n}$, $0 \le l \le 2L-1$, $0 \le m \le M-1$, $0 \le f \le M_d-1$, where l is the spatial beam index, m is the FD component index (delay tap index), f is the Doppler component index. At sheet f, $0 \le f \le M_d-1$, $\tilde{W}_2(:,:,f)$ (in the matlab matrix convention) is a $2L \times M$ matrix. $X \times_2 Y$ is the matrix product along the 2nd dimension of X to Y. $X \times_3 Y$ is the matrix product along the 3rd dimension of X to Y. Hence, $(\tilde{W}_2 \; ^3W_d(t, :)^H)$ is a matrix of dimension $2L \times M \times 1$. $(\tilde{W}_2 \; ^3W_d(t,:)^H) \times_2 W_f^H$ is a matrix of dimension $2L \times N_3 \times 1$ and $\tilde{W}$ is a matrix of dimension $2N_1N_2 \times N_3 \times 1$, which is the precoder at time t for $N_3$ precoding subbands.

Figure 8:
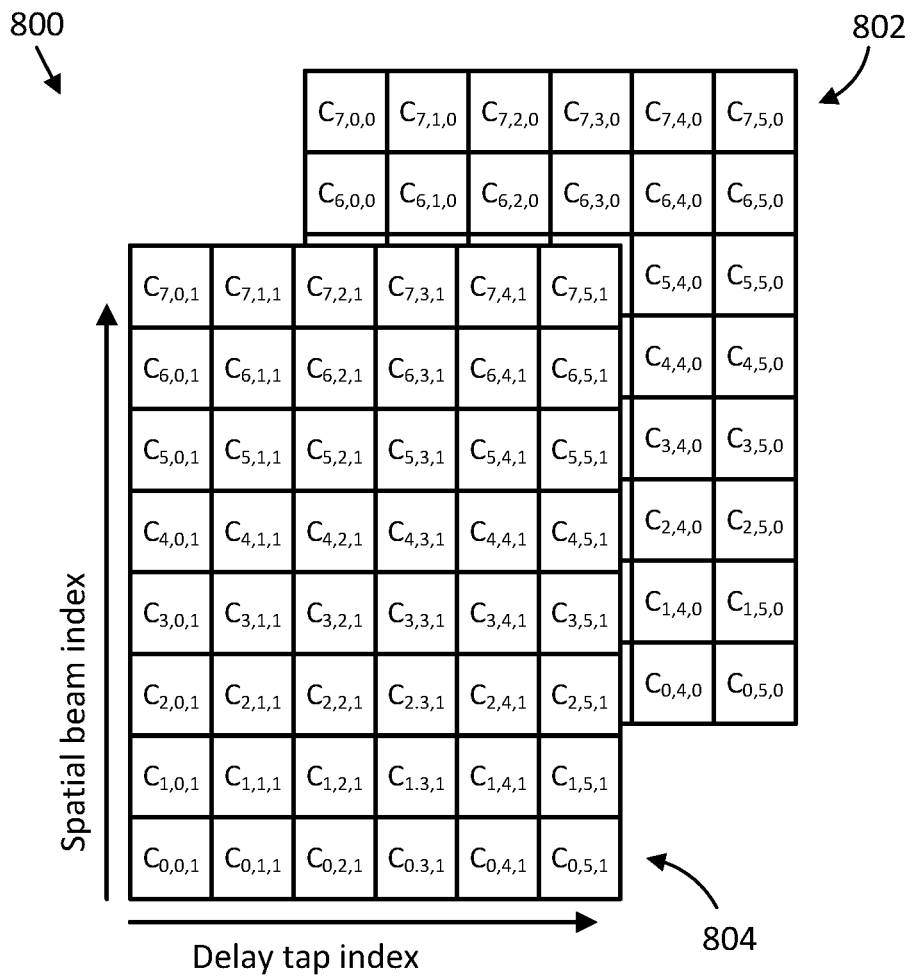
FIG. 8 illustrates an example codebook with single sheets and power delay profiles in accordance with some embodiments.
Figure 8:
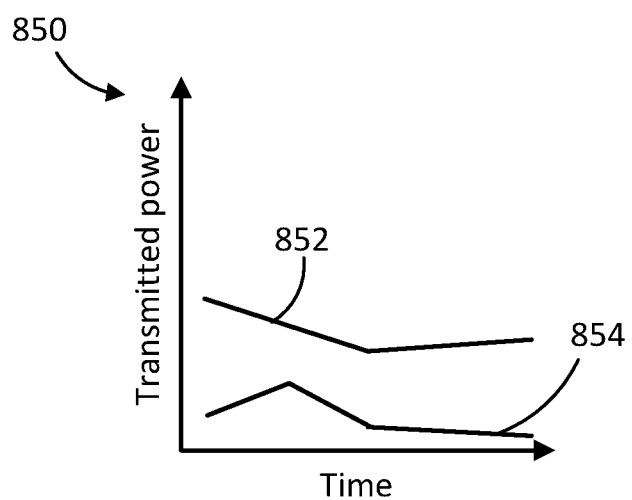

In some embodiments, the codebook may implement multiple sheets (also referred to as "pages") for a codebook within a codebook design. FIG. 8 illustrates an example codebook 800 with single sheets and power delay profiles 850 in accordance with some embodiments. In particular, the codebook 800 may have a single sheet for each spatial layer.

The illustrated codebook 800 may be for two spatial layers. In particular, the codebook 800 may include a first sheet 802 for a first spatial layer (which may be referred to as "spatial layer 0") and a first sheet 804 for a second spatial layer (which may be referred to as "spatial layer 1"). The first sheet 802 may include precoding definitions for the first spatial layer and the first sheet 804 may include precoding definitions for the second spatial layer. The base stations and/or UEs may utilize the precoding definitions of the first sheet 802 for precoding signals transmitted in the first spatial layer and the precoding definitions of the first sheet 804 for precoding signals transmitted in the second spatial layer. The illustrated case in FIG. 8 may arise due to insignificant Doppler frequency components in the codebook other than the zero frequency offset component after shifting the frequency offsets as described above, for example, for stationary UE, stationary gNB and stationary propagation environment. Since there is only a single sheet in the CSI feedback for spatial layer 1 and also a single sheet in the CSI feedback for spatial layer 2, the Doppler frequency index is omitted in the linear combination coefficient notations shown in FIG. 8, $C_{l,m,n}$ instead of $C_{l,m,f,n}$ is used. It may also happen at one spatial layer, there is only one sheet but there are multiple sheets at another spatial layer.

The power delay profiles 850 may illustrate power delay profiles at a spatial beam for the spatial layers. In particular, the power delay profiles 850 may include a first power delay profile 852 and a second power delay profile 854. The first power delay profile 852 may correspond to the first spatial layer and the second power delay profile 854 may correspond to the second spatial layer. As can be seen, the first power delay profile 852 may peak at an earlier time than the second power delay profile 854, such that the first signal corresponding to a spatial beam at the first spatial layer peaks at a different time than the second signal corresponding to the spatial beam at the second spatial layer.

FIG. 9 illustrates a portion of codebook 900 with multiple sheets in accordance with some embodiments. Each sheet may correspond to a Doppler frequency offset. In particular, the portion of the codebook 900 may be an example of a portion of the codebook 900 corresponding to a single layer. In FIG. 9, linear combination coefficients $C_{l,m,f,n}$ for n=1, $0 \le l \le 8-1$, $0 \le m \le 6-1$, $-2 \le f \le 2$ are shown.

The portion of the codebook 900 may include multiple sheets corresponding to a single spatial layer. For example, the portion of the codebook 900 may include five sheets corresponding to a single spatial layer in the illustrated embodiment. In particular, the portion of the codebook 900 may include a first sheet 902, a second sheet 904, a third sheet 906, a fourth sheet 908, and a fifth sheet 910.

Each of the sheets may correspond to one frequency offset. For example, the third sheet 906 may correspond to the spatial layer without a frequency offset, which may be represented as frequency offset $0 \cdot \Delta f$. The second sheet 904 may correspond to the spatial layer with a frequency offset of positive one, which may be represented as frequency offset $1 \cdot \Delta f$. The first sheet 902 may correspond to the spatial layer with a frequency offset of positive two, which may be represented as frequency offset $2 \cdot \Delta f$. The fourth sheet 908 may correspond to the spatial layer with a frequency offset of negative one, which may be represented as frequency offset $-1 \cdot \Delta f$. The fifth sheet 910 may correspond to the spatial layer with a frequency offset of negative 2, which may be represented as frequency offset $-2 \cdot \Delta f$.

The base station and/or the UE may utilize the sheets with their corresponding frequency offsets to construct one or more precoders for signals to be transmitted.

At sheet f, $0 \le f \le M_d-1$, $\tilde{W}_2(:,:,f)$ (in the matlab matrix convention) is a $2L \times M$ matrix. To reduce feedback overhead, sheet specific spatial beam selection and/or FD component selection can be used. Let $\tilde{W}_{2,f}(l, m) = \tilde{W}_2(l, m, f)$, $0 \le l \le 2L-1$, $0 \le m \le M-1$, so $\tilde{W}_{2,f}$ is a $2L \times M$ matrix. Then one design is $\tilde{W}_{2,f} = S_{f,1} \; \overline{W}_{2,f} \; S_{f,2}^T$ where $S_{f,1}$ is $2L \times L'$ matrix consisting of elements at 0 or 1, there is only one element with "1" on each column, and there is at most one element with "1" on each row, $0 \le L' \le 2L$ if TD component selection is not separately indicated, and $0 < L' \le 2L$ if TD component selection can be jointly signalled with sheet-specific spatial beam selection and/or FD component selection. $S_{f,1}$ indicates there are L' spatial beams with non-zero linear combination (LC) coefficients and their positions among the 2L spatial beams which can be commonly selected for all spatial layers or for a single spatial layer, then sheet-specific spatial beam selection can help reduce feedback overhead. Similarly sheet-specific FD component selection can be done through $S_{f,2}$, and $S_{f,2}^T$ is the matrix transpose of $S_{f,2}$, $S_{f,2}$ is $M \times M'$ matrix consisting of elements at 0 or 1, there is only one element with "1" on each column, and there is at most one element with "1" on each row, $0 \le M' \le M$ if TD component selection is not separately indicated, and $0 < M' \le M$ if TD component selection can be jointly signalled with sheet-specific spatial beam selection and/or FD component selection. $S_{f,2}$ indicates there are M' FD components with non-zero linear combination (LC) coefficients and their positions among the M FD components which can be commonly selected for all spatial layers or for a single spatial layer, then sheet-specific FD component selection can help reduce feedback overhead. $\overline{W}_{2,f}$ is a $L' \times M'$ matrix. It can be seen instead of using bitmap matrix with size $2L \times M$ to indicate the positions of non-zero LC coefficients, with the signaling on $S_{f,1}$ and $S_{f,2}$, only a bitmap matrix with size $L' \times M'$ is needed, consequently feedback overhead can be reduced. Note for sheets at a spatial layer, their respective. $S_{f,1}$ can be different; and their respective $S_{f,2}$ can be different.

Figure 10:
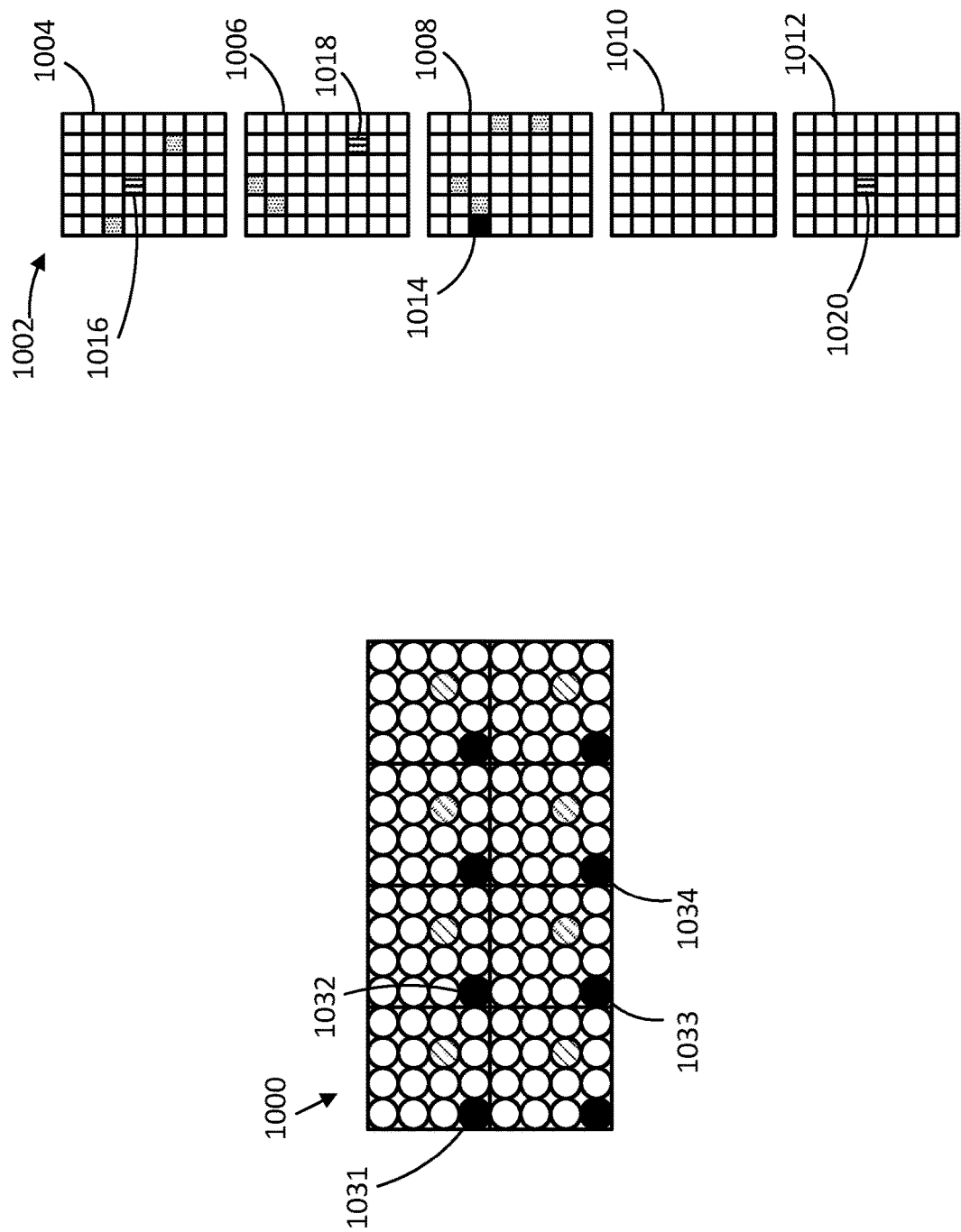
FIG. 10 illustrates an example spatial beam selection in accordance with some embodiment.

FIG. 10 illustrates an example spatial beam selection 1000 in accordance with some embodiment. The spatial beam selection 1000 may indicate spatial beam selection for one or more antennas. In particular, the spatial beam selection 1000 may determine the beam to be utilized for transmission by one or more antennas, such as an antenna array.

The spatial beam selection 1000 may provide beam selection for a spatial layer or multiple spatial layers (e.g. all the spatial layers), such as indicated by a spatial beam selection representation 1031, 1032, 1033 and 1034. In 1000, 4 spatial beams are selected commonly for two antenna polarizations, which results into a common spatial beam selection for all sheets. After the common spatial beam selection, then a sheet-specific spatial beam selection is conducted. Alternatively, without going through a common spatial beam stage, the spatial beam selection for each sheet can be conducted independently, including choosing different rotation factors. As such, the spatial beam selection representation 1002 for a given sheet may include one or more of the features of the spatial beam selection representation 200 (FIG. 2). The spatial beam selection representation 1002 may include orthogonal DFT beams as indicated by the black filled circles, rotated DF beams as indicated by the diagonal stripe filled circles, and/or oversampled DFT beams as indicated by the unfilled circles. The rotated DFT beams in the illustrated embodiment may be rotated from the orthogonal DFT beams by rotation factors of $q_1=\frac{2}{4}$ and $q_2=\frac{1}{4}$ In another variation, to reduce implementation effort, the same rotation factors can be used for different sheets, yet spatial beams selection is independently conducted for different sheets.

The spatial beam selection 1000 may provide the beam selection for the orthogonal DFT beams of the spatial beam selection representation 1002. For example, four spatial beams (1031, 1032, 1033, and 1034) may be selected for a first polarization (which may be referred to as "polarization 0") and for a second polarization (which may be referred to as "polarization 1") in the illustrated embodiment, for a total of eight spatial beams. The eight spatial beams may be commonly selected for all spatial layers and/or all sheets at a spatial layer. Further selection among the eight spatial beams may be conducted particular to a specific sheet, such that a smaller bitmap matrix can be used for the sheet. The further selection may be conducted through spatial beam selection and/or combinatorial indexing encoding.

For example, the spatial beam selection 1000 may provide spatial beam selection representations 1002 for one or more sheets. In the illustrated embodiment, the spatial beam selection representations 1002 may comprise beam selection representations for five sheets. In particular, the spatial beam selection representations 1002 may include a first sheet 1004, a second sheet 1006, a third sheet 1008, a fourth sheet 1010, and a fifth sheet 1012. The first sheet 1004 may correspond to the first sheet 902, the second sheet 1006 may correspond to the second sheet 904, the third sheet 1008 may correspond to the third sheet 906, the fourth sheet 1010 may correspond to the fourth sheet 908, and the fifth sheet 1012 may correspond to the fifth sheet 910. The top four rows in each of the sheets may correspond to a first polarization and the bottom four rows in each of the sheets may correspond to a second polarization. The x-axis for each of the sheets may correspond to FD components and the y-axis may correspond to spatial beams, where each square in the sheets corresponds to an LC coefficient of the FD component and an index of the spatial beams.

The sheets of the spatial beam selection 1000 may have the frequency offsets of the corresponding sheets of the portion of the codebook 900. For example, the first sheet 1004 may have a frequency offset of positive two (which may be represented as $2\cdot\Delta f$). The second sheet 1006 may have a frequency offset of positive one (which may be represented as $1\cdot\Delta f$). The third sheet 1008 may have a frequency offset of zero (which may be represented as $0\cdot\Delta f$). The fourth sheet 1010 may have a frequency offset of negative one (which may be represented as $-1\cdot\Delta f$). The fifth sheet 1012 may have a frequency offset of negative two (which may be represented as $-2\cdot\Delta f$). It is understood shuffling or reindexing the sheets in a deterministic way will not materially change the codebook design.

Each of the sheets may indicate the components corresponding to non-zero LC coefficients detected by an UE. In particular, the squares with fills in the spatial beam selection representation 1002 may indicate that a non-zero LC coefficient has been detected by the UE for the corresponding spatial beam at the corresponding FD component. Of the non-zero LC coefficients detected, the strongest LC coefficient and/or the strongest LC coefficient per sheet may be indicated. For example, a first LC coefficient 1014 in the third sheet 1008 may correspond to a strongest LC coefficient of the non-zero LC coefficients detected from all sheets, as indicated by the black fill of the first LC coefficient 1014. A second LC coefficient 1016 may be a strongest LC coefficient in the first sheet 1004, as indicated by the vertical line fill of the second LC coefficient 1016. A third LC coefficient 1018 may be a strongest LC coefficient in the second sheet 1006, as indicated by the vertical line fill of the third LC coefficient 1018. A fourth LC coefficient 1020 may be a strongest LC coefficient in the fifth sheet 1012, as indicated by the vertical line fill of the fourth LC coefficient 1020. LC coefficients illustrated with dotted fill may be other detected non-zero LC coefficients, while LC coefficient without fill may be LC coefficients with an amplitude of zero.

As indicated by the non-zero LC coefficients indicated within the sheets being in different locations with respect to the sheet, the spatial beam selection can be different for each of the sheets. The spatial beam selection being different for different sheets may reduce signaling overhead. Further, the spatial beam selection can be different or common for different polarizations on the same sheet. The spatial beam selection being different for different polarizations on the same sheet may reduce signaling overhead due to the bitmap matrix to indicate non-zero LC coefficients in $\overline{W}_{2,f}$. For example, the UE may signal the selected beam for each sheet and/or for each polarization in a sheet in a single CSI reporting allowing for beam selection for a plurality of frequency offsets rather than having to transmit individual CSI reports for each of the PDSCH occasions.

At a given spatial layer, there can be first a TD component selection (selecting "sheets"), then on a selected sheet, the selected spatial beams are indicated. For example, a TD component selection may select one of the five sheets from the spatial beam selection representations 1002 in the illustrated embodiment. To facilitate codebook description, a two stage selection can be considered respectively for FD component selection and another two stage selection can be used for spatial beam selection.

For FD component selection, in stage 1, a number of FD components may selected commonly for all sheets, then in stage 2, selected FD components per sheet may be a subset.

For example, FD components for each sheet may be selected based on the non-zero LC coefficients. The FD component selection for the first sheet 1004 may be represented by a bitmap (or a combinatorial index instead of the bitmap to reduce signaling overhead. Such an alternative way for overhead reduction is not re-iterated for treating other sheets), the FD component selection for the second sheet 1006 may be represented by [011010], the FD component selection for the third sheet 1008 may be represented by [111001], and the FD component selection for the fifth sheet 1012 may be represented by [001000], where the 1's indicate columns (corresponding to FD components) having one or more non-zero LC coefficients and the 0's indicate columns without any non-zero LC coefficients. As the fourth sheet 1010 does not include any non-zero LC coefficients, an FD component selection may not be made in the fourth sheet 1010. The FD components with non-zero LC coefficients may be a subset of a commonly selected FD components for selection. It may also be possible to select FD components independently for different sheets without first going through a stage where commonly selected FD components are identified for all sheets.

For spatial beam selection, in stage 1, 2L spatial beams are selected, then in stage 2, selected spatial beams per sheet are a subset. For example, TD components for each sheet may be selected based on the non-zero LC coefficients. The spatial beam selection for the first sheet 1004 may be represented by a bitmap [0011 0100] (or a combinatorial index instead of the bitmap to reduce signaling overhead. Such an alternative way for overhead reduction is not re-iterated for treating other sheets), the spatial beam selection for the second sheet 1006 may be represented by [1100 0100], the spatial beam selection for the third sheet 1008 may be represented by [0111 0100], and the spatial beam selection for the fifth sheet 1012 may be represented by [0001 0000], where the 1's indicate rows (corresponding to spatial beams) having one or more non-zero LC coefficients and the 0's indicate rows without any non-zero LC coefficients. As the fourth sheet 1010 does not include any non-zero LC coefficients, a spatial beam selection may not be made for the fourth sheet 1010. The spatial beams with non-zero LC coefficients may be a subset a commonly selected spatial beams for selection.

In some embodiments, the UE may report the spatial beam selection and/or the FD component selection in a CSI report to the base station. For example, the UE may report the spatial beam selection representations and/or the FD component selection representations indicated above to the base station for selection of spatial beams and FD components for transmission by the base station. In instances where a sheet does not have non-zero LC coefficients (such as the fourth sheet 1010), the UE may indicate in the CSI report that the sheet does not have non-zero LC coefficients, for example, through a bitmap indicating TD components with at least one non-zero LC coefficient or a combinatorial index instead of the bitmap.

Figure 11:
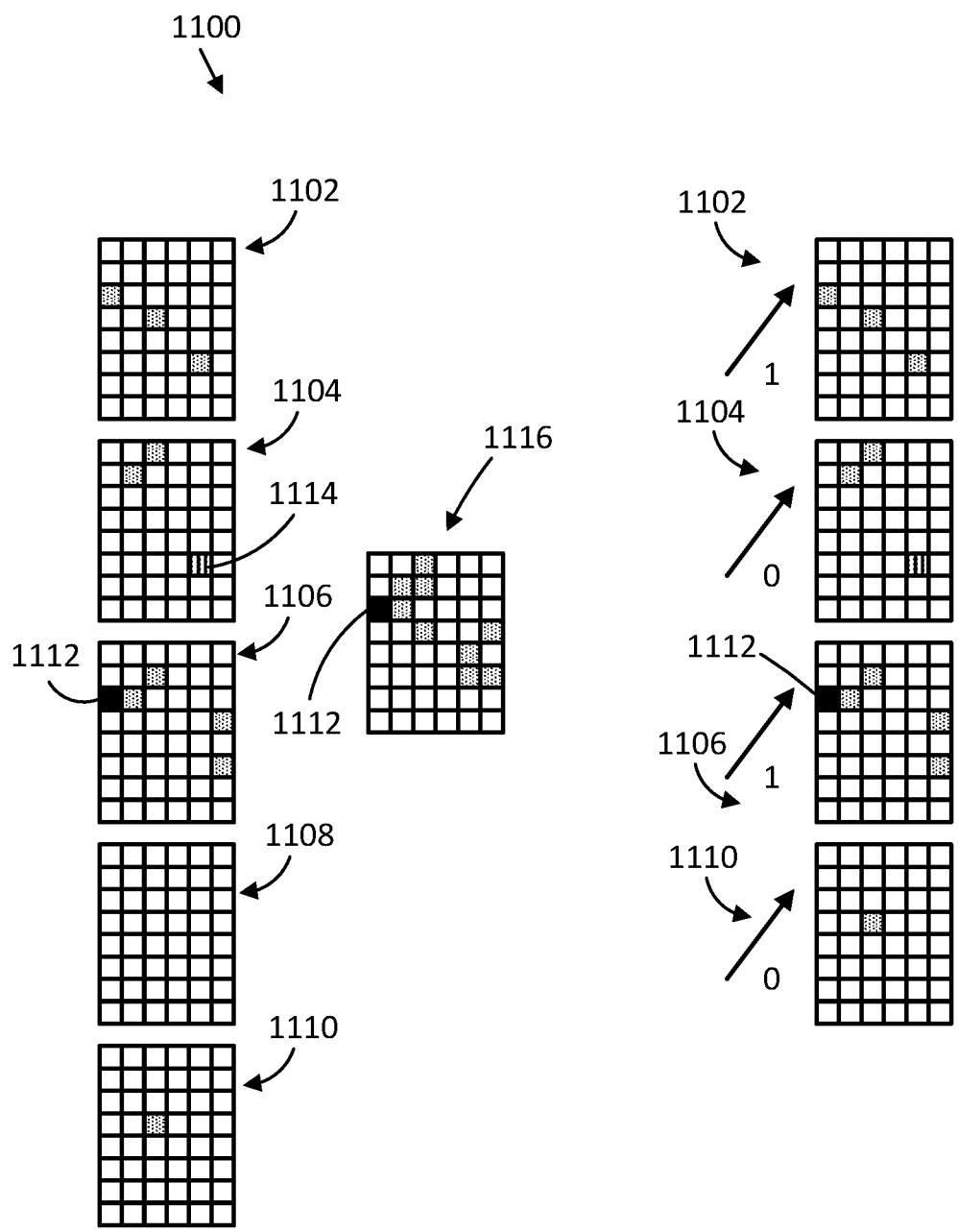
FIG. 11 illustrates an example FD component selection and indication approach in accordance with some embodiments.

FIG. 11 illustrates an example FD component selection and indication approach 1100 in accordance with some embodiments. In particular, the FD component selection and indication approach 1100 may be another approach by which a UE selects FD components for beam transmission and indicates the FD components to a base station. The FD component selection and indication approach 1100 may be treated as an addition to the release 16 (Rel-16) design of the 3GPP for RAN.

The FD component selection and indication approach 1100 may include one or more sheets, such as the sheets described in the portion of the codebook 900 (FIG. 9) and/or the sheets illustrated for the spatial beam selection representation 1002. For example, the FD component selection and indication approach 1100 includes a first sheet 1102, a second sheet 1104, a third sheet 1106, a fourth sheet 1108, and a fifth sheet 1110. The first sheet 1102 may have a frequency offset of positive two (which may be represented as $2 \cdot \Delta f$). The second sheet 1104 may have a frequency offset of positive one (which may be represented as $1 \cdot \Delta f$). The third sheet 1106 may have a frequency offset of zero (which may be represented as $0 \cdot \Delta f$). The fourth sheet 1108 may have a frequency offset of negative one (which may be represented as $-1 \cdot \Delta f$). The fifth sheet 1110 may have a frequency offset of negative two (which may be represented as $-2 \cdot \Delta f$). The top four rows of each of the sheets may correspond to a first polarization (which may be referred to as "polarization 0") and the bottom four rows of each of the sheets may correspond to a second polarization (which may be referred to as "polarization 1"). The sheets may indicate the FD component via the x-axis and the spatial beams via the y-axis, where each square in the sheets corresponds to an index of the FD component and an index of the spatial beams.

Each of the sheets may indicate non-zero LC coefficients for the corresponding frequency offset. For example, the UE may determine, based on CSI-RS, which spatial beam and FD component combinations have non-zero LC coefficients for each of the frequency offsets. The first sheet 1102 may indicate the non-zero LC coefficients with frequency offset of positive two, the second sheet 1104 may indicate the non-zero LC coefficients with frequency offset of positive one, the third sheet 1106 may indicate the non-zero LC coefficients with frequency offset of zero, the fourth sheet 1108 may indicate the non-zero LC coefficients with frequency offset of negative one, and the fifth sheet 1110 may indicate the non-zero LC coefficients with frequency offset of negative two. In particular, the sheets may indicate non-zero LC coefficients via the boxes with fills in the illustrated embodiment, whereas the boxes without fills (for example, the boxes that are white) indicate LC coefficients that have an amplitude of zero.

The UE may identify a strongest LC coefficient (for example, an LC coefficient with a largest amplitude) from all the sheets. In the illustrated embodiment, a first coefficient 1112 within the third sheet 1106 may be determined to be the strongest LC coefficient in the sheets, as indicated by the first coefficient 1112 being shown with black fill. The UE may further determine the polarization with which the strongest LC coefficient is associated. Since the first coefficient 1112 is located within the top four rows of the third sheet 1106 in the illustrated embodiment, the UE may determine that the strongest LC coefficient is associated with the first polarization.

The UE may then determine the strongest LC coefficients for the polarizations that do not include the strongest LC coefficient of the entire sheets. For example, since the strongest LC coefficient is associated with the first polarization in the illustrated embodiment, the UE may determine the strongest LC coefficient associated with the second polarization. In the illustrated embodiment, a second coefficient 1114 located within the second sheet 1104 may be determined to be the strongest LC coefficient associated with the second polarization, as indicated by the second coefficient 1114 being shown with a vertical line fill. As can be seen, the second coefficient 1114 is located in the bottom four rows in the illustrated embodiment, thereby indicating that the second coefficient 1114 is associated with the second polarization. The rest of the non-zero LC coefficients are illustrated with a dotted fill in the sheets.

The UE may combine the first sheet 1102, the second sheet 1104, the third sheet 1106, the fourth sheet 1108, and the fifth sheet 1110 into a single sheet representation 1116. In particular, the single sheet representation 1116 may illustrate all the non-zero LC coefficients from the first sheet 1102, the second sheet 1104, the third sheet 1106, the fourth sheet 1108, and the fifth sheet 1110 in the single sheet representation 1116, where the LC coefficients maintain their spatial beam and FD component relationship from the first sheet 1102, the second sheet 1104, the third sheet 1106, the fourth sheet 1108, and the fifth sheet 1110. For example, the single sheet representation 1116 may have components with non-zero LC coefficients corresponding to each of the sheets, as illustrated by the fills in the squares. The single sheet representation 1116 may further indicate the strongest LC coefficient of the sheets, as shown by third coefficient 1118 being illustrated with black fill. The other non-zero LC coefficients in the single sheet representation 1116 are illustrated with dotted fill in the illustrated embodiment. In other instances, the non-zero LC coefficients may be illustrated with 1's, whereas the LC coefficients having zero amplitude are labeled with 0's or are unlabeled. If on sheets 1102, 1104, 1106, 1110, non-zero LC coefficients are converted into single bits with logical "1"s and zero LC coefficients are converted into single bits with logical "0", 1116 can be obtained through the logical "OR" operation over 4 matrices with "0"/"1" as their elements, corresponding to sheets 1102, 1104, 1106, 1110 respectively.

The UE may perform spatial beam selection and/or FD component selection based on the single sheet representation 1116. For example, the UE may perform spatial beam selection based on the non-zero LC coefficients and/or FD component selection based on the non-zero LC coefficients. In the illustrated embodiment, the spatial beam selection may be represented by a bitmap [11111100] (or a combinatorial index instead of bitmap for overhead reduction), where the 1's indicate rows (which represent a spatial beam index) that have a non-zero LC coefficient and 0's indicate rows that are without a non-zero LC coefficient. The FD component selection may be represented by a bitmap [111011] (or a combinatorial index instead of bitmap for overhead reduction), where the 1's indicate columns (which represent a FD component index) that have a non-zero LC coefficient and 0's indicate columns that are without a non-zero LC coefficient. In some embodiments, the UE may report the spatial beam selection and/or the FD component selection in a CSI report to a base station. The base station may utilize the spatial beam selection and/or the FD component selection for communicating with the UE.

The UE may further filter the sheets to remove sheets that do not include non-zero LC coefficients. The UE may indicate sheets that do not include non-zero LC coefficients that have been filtered, or may not indicate the sheets that do not include non-zero LC coefficients that have been filtered in a CSI report to a base station. For example, filtered sheet representations 1120 in the illustrated embodiment may have filtered the fourth sheet 1108 based on the fourth sheet not including any non-zero LC coefficients. Accordingly, the filtered sheet representation 1120 may include the first sheet 1102, the second sheet 1104, the third sheet 1106, and the fifth sheet 1110 in the illustrated representation. For each of non-zero location on the bitmap (represented by the sheets in the illustrated embodiment), there is at least one LC coefficient at all the selected sheets for the filtered sheet representation 1120. Filtering of the sheets that do not include non-zero LC coefficients may reduce the size of signals (such as CSI reports) transmitted by the UE to the base station, which may reduce overhead.

The UE may further determine which of the sheets in the filtered sheet representation 1120 have a non-zero LC coefficient at a particular component position (a particular sheet). For example, the UE may determine which of the sheets in the filtered sheet representation 1120 include a non-zero LC coefficient at a position corresponding to the strongest LC coefficient, which is the position of the first coefficient 1112 in the illustrated embodiment. Further, the UE may generate a representation of the sheets that include the non-zero LC coefficient at the position, which may be referred to as Doppler component composition signaling. In the illustrated embodiment, the first sheet 1102 and the third sheet 1106 includes a non-zero LC coefficient at the location of the strongest LC coefficient. The second sheet 1104 and the fifth sheet 1110 do not include a non-zero LC coefficient at the location of the strongest LC coefficient. The representation of the sheets having a non-zero LC coefficient at the location of the strongest LC coefficient may be a bitmap [1010], where the 1's indicate sheets that have the non-zero LC coefficient and the 0's indicate sheets that do not have the non-zero LC coefficient. The representation with a bitmap [1010] may be ordered from lowest sheet value at the left to highest sheet value at the right of the filtered sheet representation 1120. The fourth sheet 1108 may be omitted from the representation due to the fourth sheet 1108 not being included in the filtered sheet representation 1120. The determination and generation of representations may be repeated for other locations in the sheets. It is also understood a bitmap can be replaced with a combinatorial index for overhead reduction.

The UE may report the Doppler component composition signaling with the spatial beam selection representation and/or the FD component selection representation from the single sheet representation 1116 in a CSI report in some embodiments. In these embodiments, the base station may determine a beam to be utilized for communication with the UE based on the Doppler component composition signaling, the spatial beam selection representation and/or the FD component selection representation. For example, the base station may select a beam to be utilized from the spatial beam selection representation and/or the FD component selection representation. In some embodiments, the base station may select the beam corresponding to the strongest LC coefficient (represented by the third coefficient 1118 in the illustrated embodiment) based on the spatial beam selection representation and/or the FD component selection representation for communication with the UE. The base station may then utilize the Doppler component composition signaling to determine at which frequency offsets the selected beam provides a non-zero LC coefficient. The base station may then utilize the selected beam at the frequency offsets to communicate with the UE.

Figure 12:
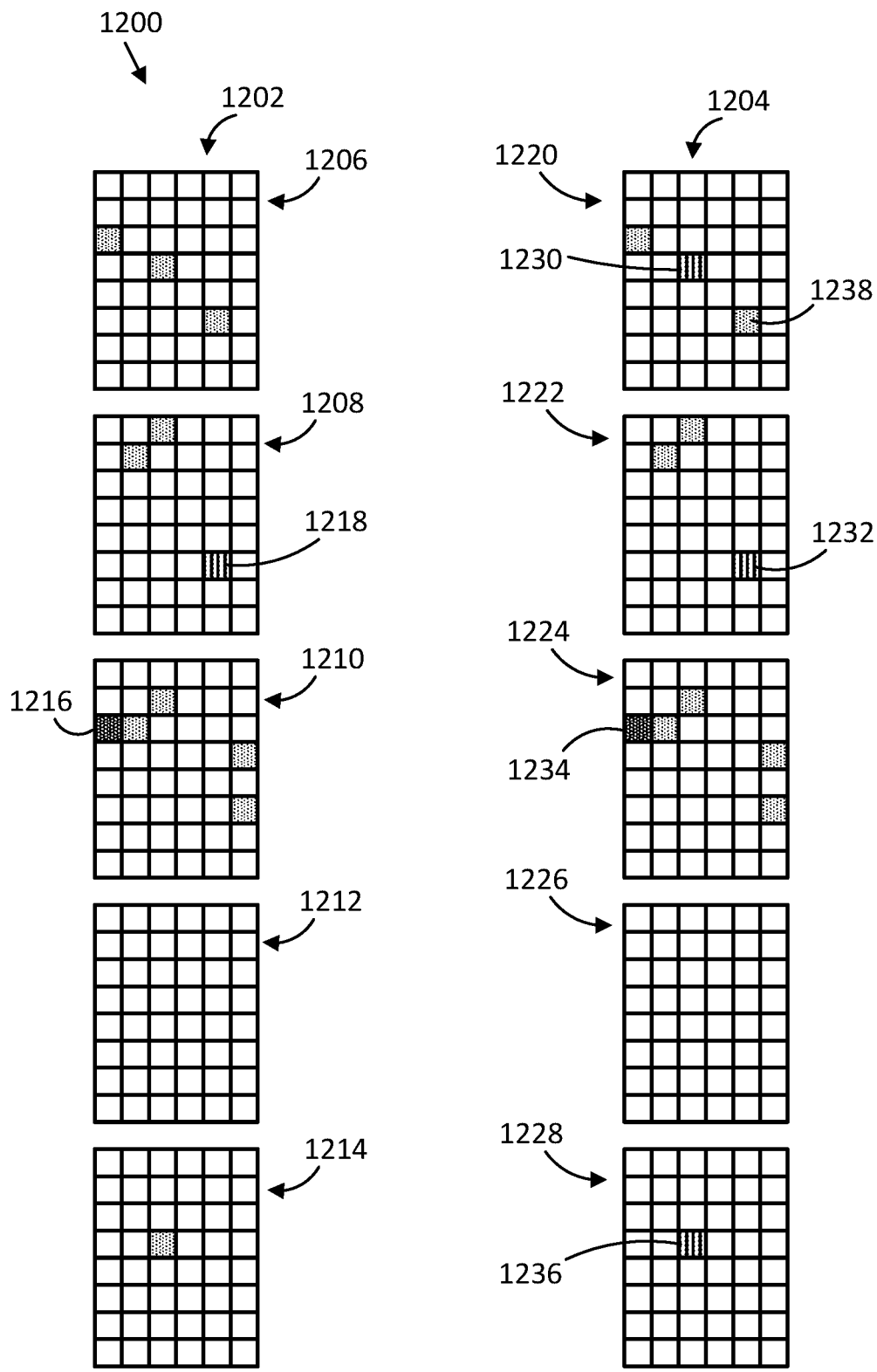
FIG. 12 illustrates an example quantization designs in accordance with some embodiments.

FIG. 12 illustrates an example quantization designs 1200 in accordance with some embodiments. For example, the quantization designs 1200 illustrated may include a per polarization across sheets design 1202 prior to quantization and a per sheet design 1204.

There may be multiple versions of quantizers (parameterized by different sets of parameters) that may be utilized to achieve lower quantization errors. In some embodiments, the multiple versions of quantizers may be UE-defined quantizers that may try to achieve lower quantization errors for a given overhead. The quantizer designs for reference for quantization may be per polarization across sheets, per polarization/per sheet, per sheet, and/or divide LC coefficients into groups design. The per polarization/per sheet design may have two references for two polarizations on each selected sheet and/or may be applied to selected sheets. The divide LC coefficients into groups design may have a per-group reference. The strongest LC coefficient among LC coefficients over all sheets can be identified and is used to normalize (or divide) all the LC coefficients over all sheets. Then the strongest LC coefficient in a group can be identified and its amplitude can be quantized with high resolution amplitude quantizer. Then the quantized amplitude of the strongest LC coefficient in the group is used to divide each LC coefficient (or each non-zero LC coefficient) in the group, then each divided LC coefficient is quantized with a normal resolution quantizer. All the phases of non-zero LC coefficients in all sheets can quantized with a phase quantization e.g. with the 16PSK constellation. It is also possible to perform joint amplitude-phase quantization rather than separate amplitude and phase quantizations. In some embodiment, one group consists of the LC coefficients on the same polarization and the same sheet as the strongest LC coefficient from all sheets, and another group consists of the LC coefficients which are at a different polarization or at a different sheet from the strongest LC coefficients from all sheets.

In the per polarization across sheets design 1202, each of the LC coefficients within a polarization across the sheets may be quantized based on a selected LC coefficient from the sheets. For example, the illustrated embodiment of the per polarization across sheets design 1202 may include a first sheet 1206, a second sheet 1208, a third sheet 1210, a fourth sheet 1212, and a fifth sheet 1214 for a codebook. The first sheet 1206 may have a frequency offset of positive two (which may be represented as 2·Δf). The second sheet 1208 may have a frequency offset of positive one (which may be represented as 1·Δf). The third sheet 1210 may have a frequency offset of zero (which may be represented as 0·Δf). The fourth sheet 1212 may have a frequency offset of negative one (which may be represented as −1·Δf). The fifth sheet 1214 may have a frequency offset of negative two (which may be represented as −2·Δf). The top four rows in each of the sheets may correspond to a first polarity and the bottom four rows in each of the sheets may correspond to a second polarity. The x-axis for each of the sheets may correspond to FD components and the y-axis may correspond to spatial beams, where each square in the sheets corresponds to an index of the FD component and an index of the spatial beams.

The UE may determine an LC coefficient in each of the polarizations with which to perform a quantization for the LC coefficients in the sheets. For example, the UE may identify a strongest LC coefficient (for example, an LC coefficient with a greatest amplitude) among all sheets, which is found by the UE to be associated with one polarization (the "stronger" polarization) (such as a first polarization) from the sheets and identify a strongest LC coefficient associated with another polarization (the "weaker" polarization) (such as a second polarization) from sheets. The UE may utilize the strongest LC coefficient associated with the first polarization to quantize the LC coefficients associated with the first polarization and utilize the strongest LC coefficient associated with the second polarization to quantize the LC coefficients associated with the second polarization.

In the illustrated embodiment, the UE may identify a first coefficient 1216 associated with the first polarization (as indicated by being within the top four rows) as a strongest LC coefficient (as indicated by the black fill of the first coefficient 1216). The UE may identify an amplitude of the first coefficient 1216 and utilize the first coefficient 1216 to normalize the LC coefficients associated with the first polarization (for example, the LC coefficients located within the top four rows). For example, the UE may divide the LC coefficients associated with both polarizations by the first coefficient 1216 to normalize the LC coefficients. A first quantization scheme may be defined based on a number of bits to be utilized for the quantization to define an alphabet for the quantization. The UE may convert each of the normalized LC coefficients associated with the "stronger" polarization to a corresponding value in the alphabet for the quantization with the first quantization scheme. The UE may then utilize the quantized values for reporting the values of the LC coefficients in a CSI report transmitted to a base station.

In the illustrated embodiment, after normalization with the strongest coefficient from both polarizations, the UE may identify a second coefficient 1218 associated with the "weaker" polarization (the second polarization as indicated by being within the bottom four rows in the example) as a strongest LC coefficient (as indicated by the vertical line fill of the second coefficient 1218) within the "weaker" polarization. A second quantization scheme is defined based on a number of bits to be utilized for the quantization to define an alphabet for the quantization, and the second quantization scheme may have more bits than the first quantization scheme. The UE may convert the second coefficient to a corresponding value in the alphabet for the quantization with the second quantization scheme. The UE may identify a quantized amplitude of the second coefficient 1218 and utilize the quantized amplitude of the second coefficient 1218 to divide the LC coefficients associated with the second polarization (for example, the LC coefficients located within the bottom four rows). For example, the UE may divide the amplitudes of the LC coefficients associated with the second polarization by the quantized amplitude of the second coefficient 1218 to normalize the amplitudes of the LC coefficients with the first quantization scheme. In some embodiments, the number of bits to be utilized for quantization of the second polarization may be the same as the number of bits to be utilized for quantization of the first polarization. The UE may convert each of the normalized LC coefficients associated with the second polarization to a corresponding value in the alphabet for the quantization. In some embodiments, the UE may perform phase quantization for the normalized LC coefficients at both polarizations. The UE may then utilize the quantized values for reporting the values of the LC coefficients in a CSI report transmitted to a base station.

In the per sheet design 1204, the strongest LC coefficient among all sheets is identified, and all the coefficients at all sheets can be divided by the strongest LC coefficient among all sheets. After that, each of the LC coefficients within a sheet may be quantized based on a selected LC coefficient from the sheet. For example, the illustrated embodiment of the per sheet design 1204 may include a first sheet 1220, a second sheet 1222, a third sheet 1224, a fourth sheet 1226, and a fifth sheet 1228 for a codebook. The first sheet 1220 may have a frequency offset of positive two (which may be represented as 2·Δf). The second sheet 1222 may have a frequency offset of positive one (which may be represented as 1·Δf). The third sheet 1224 may have a frequency offset of zero (which may be represented as 0·Δf). The fourth sheet 1226 may have a frequency offset of negative one (which may be represented as −1·Δf). The fifth sheet 1228 may have a frequency offset of negative two (which may be represented as −2·Δf). The top four rows in each of the sheets may correspond to a first polarity and the bottom four rows in each of the sheets may correspond to a second polarity. The x-axis for each of the sheets may correspond to FD components and the y-axis may correspond to spatial beams, where each square in the sheets corresponds to an index of the FD component and an index of the spatial beams.

The UE may determine an LC coefficient in each of the sheets with which to perform a quantization for the LC coefficients in each of the sheets. For example, the UE may identify a strongest LC coefficient (for example, an LC coefficient with a greatest amplitude) from the first sheet 1220, a strongest LC coefficient from the second sheet 1222, a strongest LC coefficient from the third sheet 1224, a strongest LC coefficient from the fourth sheet 1226, and a strongest LC coefficient from the fifth sheet 1228. In instances where a sheet does not have any non-zero LC coefficients (such as the fourth sheet 1226 in the illustrated embodiment, the quantization of the sheet may not be performed. The UE may first quantize the amplitude of the strongest coefficient at each sheet with a high resolution quantization scheme. The UE may utilize the quantized amplitude of the strongest LC coefficient from the first sheet 1220 to normalize (or divide) the LC coefficients within the first sheet 1220, utilize the quantized amplitude of the strongest LC coefficient from the second sheet 1222 to normalize (or divide) the LC coefficients within the second sheet 1222, utilize the quantized amplitude of the strongest LC coefficient from the third sheet 1224 to normalize (or divide) the LC coefficients within the third sheet 1224, and utilize the quantized amplitude of the strongest LC coefficient from the fifth sheet 1228 to normalize (or divide) the LC coefficients within the fifth sheet 1228 in the illustrated embodiment.

In the illustrated embodiment, the UE may identify a first coefficient 1230 of the first sheet 1220 as a strongest LC coefficient (as indicated by the vertical striped fill of the first coefficient 1230). The UE may identify a quantized amplitude of the first coefficient 1230 with a high resolution quantization scheme and utilize the quantized amplitude of the first coefficient 1230 to divide the LC coefficients within the first sheet 1220. For example, the UE may divide the amplitudes of the LC coefficients within the first sheet 1220 by the quantized amplitude of the first coefficient 1230 to normalize the amplitudes of the LC coefficients. The quantized amplitude of the first coefficient 1230 may be obtained through a high resolution quantization scheme which is based on a number of bits to be utilized for the quantization to define an alphabet for the quantization. The UE may convert each of the divided LC coefficients within the first sheet 1220 to a corresponding value in the alphabet for the quantization with a normal quantization scheme. The UE may then utilize the quantized values for reporting the values of the LC coefficients in a CSI report transmitted to a base station.

In the illustrated embodiment, the UE may identify a second coefficient 1232 of the second sheet 1222 as a strongest LC coefficient (as indicated by the vertical striped fill of the second coefficient 1232). The UE may identify a quantized amplitude of the second coefficient 1232 and utilize the quantized amplitude of the second coefficient 1232 to normalize/divide the LC coefficients within the second sheet 1222. For example, the UE may divide the amplitudes of the LC coefficients within the second sheet 1222 by the quantized amplitude of the second coefficient 1232 to normalize/divide the amplitudes of the LC coefficients. The quantized amplitude of the second coefficient 1232 may be obtained through a high resolution quantization scheme which is based on a number of bits to be utilized for the quantization to define an alphabet for the quantization. The UE may convert each of the normalized LC coefficients within the second sheet 1222 to a corresponding value in the alphabet for the quantization with a normal resolution amplitude quantization. The UE may then perform phase quantization for the normalized LC coefficients at both polarizations. The UE may then utilize the quantized values for reporting the values of the LC coefficients in a CSI report transmitted to a base station.

In the illustrated embodiment, the UE may identify a third coefficient 1234 of the third sheet 1224 as a strongest LC coefficient (as indicated by the black fill of the third coefficient 1234). The UE may identify a quantized amplitude of the third coefficient 1234 and utilize the quantized amplitude of the third coefficient 1234 to normalize/divide the LC coefficients within the third sheet 1224. For example, the UE may divide the amplitudes of the LC coefficients within the third sheet 1224 by the quantized amplitude of the third coefficient 1234 to normalize the amplitudes of the LC coefficients. The quantized amplitude of the third coefficient 1234 may be obtained through a high resolution quantization scheme which is based on a number of bits to be utilized for the quantization to define an alphabet for the quantization. The UE may convert each of the normalized LC coefficients within the third sheet 1224 to a corresponding value in the alphabet for the quantization with a normal resolution quantization scheme. The UE may then utilize the quantized values for reporting the values of the LC coefficients in a CSI report transmitted to a base station.

In the illustrated embodiment, the UE may identify a fourth coefficient 1236 of the fifth sheet 1228 as a strongest LC coefficient (as indicated by the vertical striped fill of the fourth coefficient 1236). The UE may identify a quantized amplitude of the fourth coefficient 1236 and utilize the quantized amplitude of the fourth coefficient 1236 to quantize the LC coefficients within the fifth sheet 1228. For example, the UE may divide the amplitudes of the LC coefficients within the fifth sheet 1228 by the quantized amplitude of the fourth coefficient 1236 to normalize/divide the amplitudes of the LC coefficients. The amplitude of the fourth coefficient 1236 may be obtained through a high resolution quantization scheme which is based on a number of bits to be utilized for the quantization to define an alphabet for the quantization. The UE may convert each of the normalized LC coefficients within the fifth sheet 1228 to a corresponding value in the alphabet for the quantization with normal resolution quantization scheme. The UE may then perform phase quantization for the normalized LC coefficients at both polarizations. The UE may then utilize the quantized values for reporting the values of the LC coefficients in a CSI report transmitted to a base station.

In the per polarization/per sheet design, each of the LC coefficients within a sheet and associated with a polarization may be quantized based on a selected LC coefficient from the sheet and associated with the polarization. In instances where a sheet and/or a polarization of a sheet does not include non-zero LC coefficients, the sheet and/or the polarization of the sheet may be not be quantized. For clarity, the description of the per polarization/per sheet design refers to the sheets of the per sheet design 1204.

Referring to the sheets of the illustrated per sheet design 1204 embodiment, the UE may identify a strongest LC coefficient from a first polarization (as indicated by being in the top four rows) of the first sheet 1220 and identify a strongest LC coefficient from a second polarization (as indicated by being in the bottom four rows) of the first sheet 1220.

The UE may utilize the strongest LC coefficient from the first polarization of the first sheet 1220 to quantize the LC coefficients associated with the first polarization within the first sheet 1220. In the illustrated embodiment, the UE may identify the first coefficient 1230 as the strongest LC coefficient from the first polarization within the first sheet 1220 and utilize the amplitude of the first coefficient 1230 to quantize the LC coefficients associated with the first polarization within the first sheet 1220. For example, the UE may divide the amplitudes of the LC coefficients associated with the first polarization (as indicated by being in the top four rows) of the first sheet 1220 by the amplitude of the first coefficient 1230 to normalize the amplitudes of the LC coefficients. The amplitude of the first coefficient 1230 may be divided into equal parts based on a number of bits to be utilized for the quantization to define an alphabet for the quantization. The UE may convert each of the normalized LC coefficients within the first sheet 1220 to a corresponding value in the alphabet for the quantization. The UE may then utilize the quantized values for reporting the values of the LC coefficients in a CSI report transmitted to a base station.

The UE may utilize the strongest LC coefficient from the second polarization of the first sheet 1220 to quantize the LC coefficients associated with the second polarization within the first sheet 1220. In the illustrated embodiment, the UE may identify a fifth coefficient 1238 as the strongest LC coefficient from the second polarization within the first sheet 1220 and utilize the amplitude of the fifth coefficient 1238 to quantize the LC coefficients associated with the second polarization within the first sheet 1220. For example, the UE may divide the amplitudes of the LC coefficients associated with the second polarization (as indicated by being in the bottom four rows) of the first sheet 1220 by the amplitude of the fifth coefficient 1238 to normalize the amplitudes of the LC coefficients. The amplitude of the fifth coefficient 1238 may be divided into equal parts based on a number of bits to be utilized for the quantization to define an alphabet for the quantization. The UE may convert each of the normalized LC coefficients within the first sheet 1220 to a corresponding value in the alphabet for the quantization. The UE may then utilize the quantized values for reporting the values of the LC coefficients in a CSI report transmitted to a base station. The UE may repeat the process for each of the sheets within the codebook.

In the division of LC coefficients into groups design, the non-zero LC coefficients may be divided into groups and the LC coefficients within a group may be quantized based on a selected LC coefficient within the group. The definition of the groups into which the groups are divided may be predefined. In some embodiments, the groups may be defined based on spatial beams and/or FD components to which the LC coefficient belongs. For clarity, the description of the divide LC coefficients into groups design refers to the sheets of the per sheet design 1204.

For one example of the divide LC coefficients into groups design, a first group may be defined as a first three FD components within a sheet and a second group may be defined as a last three FD components within a sheet. For example, in the first sheet 1220 the LC coefficients located within the three left-most columns may be defined as a first group and the coefficients located within the three right-most columns may be defined as a second group. The UE may identify a strongest LC component within the first group and utilize an amplitude of the strongest LC component within the first group to quantize the LC components within the first group. Further, the UE may identify a strongest LC component within the second group and utilize the amplitude of the strongest LC component within the second group to quantize the LC components within the second group.

Referring to the sheets of the illustrated per sheet design 1204 embodiment, the UE may identify a strongest LC coefficient from the three left-most columns of the first sheet 1220 and may identify a strongest LC coefficient from the three right-most columns of the first sheet 1220. For example, the UE may identify the first coefficient 1230 as the strongest LC coefficient from the three right-most columns of the first sheet 1220.

The UE may utilize the strongest LC coefficient from the first group (defined as the three left-most columns of the first sheet 1220) to quantize the LC coefficients within the first group. In the illustrated embodiment, the UE may identify the first coefficient 1230 as the strongest LC coefficient from the first group within the first sheet 1220 and utilize the amplitude of the first coefficient 1230 to quantize the LC coefficients within the first group within the first sheet 1220. For example, the UE may divide the amplitudes of the LC coefficients within the first group of the first sheet 1220 by the amplitude of the first coefficient 1230 to normalize the amplitudes of the LC coefficients. The amplitude of the first coefficient 1230 may be divided into equal parts based on a number of bits to be utilized for the quantization to define an alphabet for the quantization. The UE may convert each of the normalized LC coefficients within the first group of the first sheet 1220 to a corresponding value in the alphabet for the quantization. The UE may then utilize the quantized values for reporting the values of the LC coefficients in a CSI report transmitted to a base station.

The UE may utilize the strongest LC coefficient from the second group (defined as the three right-most columns of the first sheet 1220) to quantize the LC coefficients within the second group. In the illustrated embodiment, the UE may identify the fifth coefficient 1238 as the strongest LC coefficient from the second group within the first sheet 1220 and utilize the amplitude of the fifth coefficient 1238 to quantize the LC coefficients within the second group within the first sheet 1220. For example, the UE may divide the amplitudes of the LC coefficients within the second group of the first sheet 1220 by the amplitude of the fifth coefficient 1238 to normalize the amplitudes of the LC coefficients. The amplitude of the fifth coefficient 1238 may be divided into equal parts based on a number of bits to be utilized for the quantization to define an alphabet for the quantization. The UE may convert each of the normalized LC coefficients within the second group of the first sheet 1220 to a corresponding value in the alphabet for the quantization. The UE may then utilize the quantized values for reporting the values of the LC coefficients in a CSI report transmitted to a base station. The UE may repeat the process for each of the sheets within the codebook.

Figure 13:
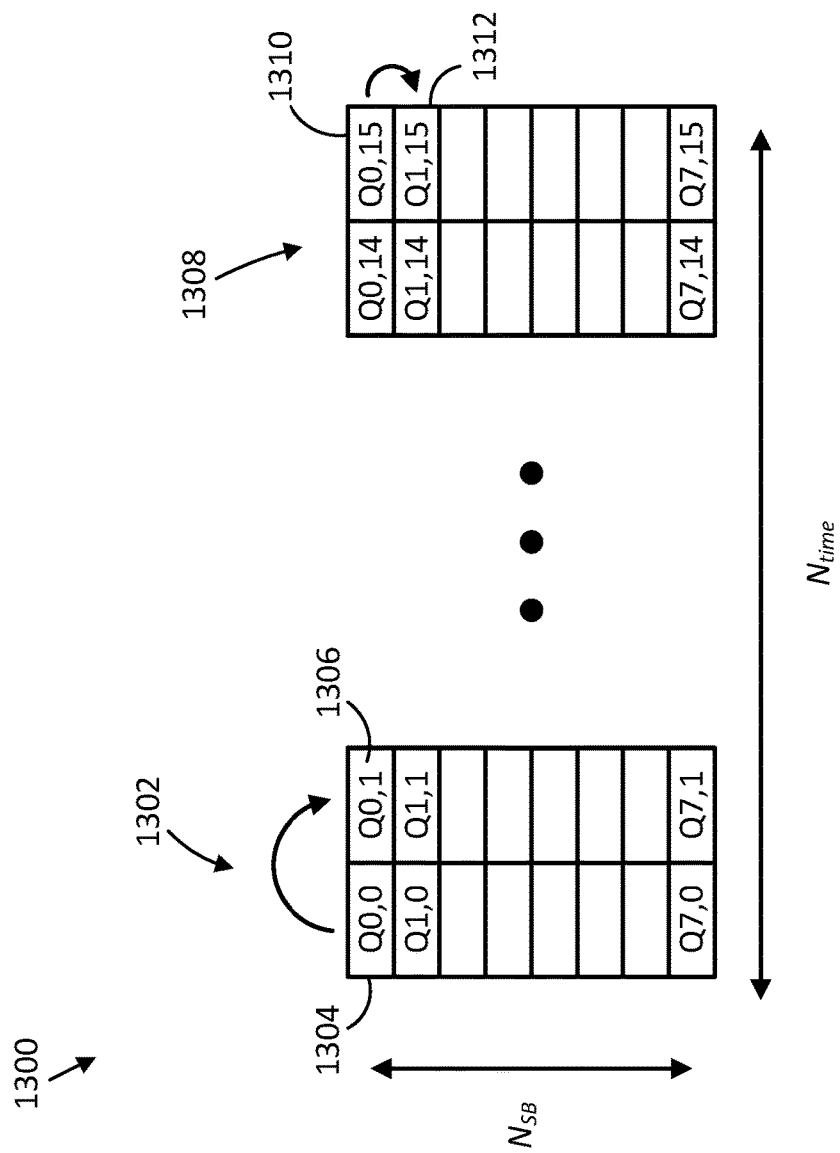
FIG. 13 illustrates example differential encoding approaches in accordance with some embodiments.

FIG. 13 illustrates example differential encoding approaches 1300 in accordance with some embodiments. For example, the differential encoding approaches 1300 illustrates example differential encodings in a time domain and a frequency domain for CQIs, such as subband CQIs. Approaches described herein for reporting CQIs in CSI reports may implement differential encoding in the time domain and/or differential encoding in the frequency domain.

A design issue addressed herein may include subband CQI feedback for multiple occasions. For example, feedback overhead for CQIs may be an issue. The issue may exist for subband CQI, and may also be present for wideband CQI when the number of PDSCH occasions is large. The feedback overhead may be addressed based at least in part by implementing differential encoding in the time domain and/or the frequency domain. In some embodiments, the differential encoding may be Huffman encoding for delta CQIs. As the difference between two subband CQIs at two neighboring subbands for the same PDSCH occasion which may include one portion or two or more portions with time-varying subband precoders, can be induced by frequency selective fading and/or frequency selective interference, the change should be gradual when there is no abrupt variation for frequency selective fading and/or frequency selective interference. Consequently the statistical mode of their difference (delta CQI) or the change tends to be around zero. And The difference between subband CQIs at the same subband for different PDSCH occasions which may include one portion or two or more portions with time-varying subband precoders, can be induced by time-selective fading and time selective interference, the change should be gradual when there is no abrupt variation for time selective fading and/or time selective interference. Consequently the statistical mode of their difference (delta CQI) or the change tends to be around zero. From the non-equal probability to have a value like 0 dB, 1 dB, −1 dB, 2 dB, −2 dB, for their change or the difference (delta CQI), entropy encoding in general Huffman encoding in particular can help reduce feedback for delta CQIs, for example, code "0" is used for 0 dB, code "100" is used for 1 dB, code "101" is used for −1 dB, etc. To allow a consistent understanding between the UE and the base station, the Huffman encoding dictionary can be signalled by the base station or indicated by the UE. Due to the use of entropy encoding, the payload size for CQIs which can be wideband CQIs and/or subband CQIs using delta CQIs may not be fixed as it is subject to channel/interference fluctuation in the time domain and/or in the frequency domain. Due to that, the CQI UCIs can be carried in UCI part 2 in a PUCCH and in portion for CSI part-1 or CSI part-2 in a PUSCH as in Rel-16, and the CQI UCIs size is carried in UCI part 1 in a PUCCH and in the portion for hybrid automatic repeat request acknowledgement (HARQ-ACK) feedback in a PUSCH as in Rel-16.

The differential encoding approaches 1300 may include a time-domain differential encoding approach. The time-domain differential encoding approach may include encoding a plurality of subbands 1302. The x-axis of the plurality of subbands 1302 is for time and the y-axis of the plurality of subbands 1302 is for subband frequencies. The UE may perform differential encoding of CQI for the same subband in the time domain. For example, the UE may identify a first subband 1304 and a second subband 1306 from the plurality of subbands 1302. The second subband 1306 may be subsequent to the first subband 1304 in the time domain. The UE may determine a difference between the first subband 1304 and the second subband 1306, and may perform encoding based on the difference. The UE may perform the differential encoding for each of the subbands within the plurality of subbands 1302. The UE may report a reference CQI and delta CQIs with the encoding in CSI reports transmitted to a base station.

The differential encoding approaches 1300 may include a frequency domain-domain differential encoding approach. The frequency-domain differential encoding approach may include encoding a plurality of subbands 1308. The x-axis of the plurality of subbands 1308 is for time and the y-axis of the plurality of subbands 1308 is for subband frequencies. The UE may perform differential encoding of adjacent subbands in the frequency domain. For example, the UE may identify a first subband 1310 and a second subband 1312 from the plurality of subbands 1308. The second subband 1312 may be subsequent to the first subband 1310 in the frequency domain. The UE may determine a difference between the first subband 1310 and the second subband 1312, and may perform encoding based on the difference. The UE may perform the differential encoding for each of the subbands within the plurality of subbands 1308. The UE may report the CQIs with the encoding in CSI reports transmitted to a base station.

As described above, approaches described herein may introduce the time-domain in the codebook design. At a given spatial layer, the UE can report the selected TD components, the UE can report the selected spatial beams per selected TD component (or per sheet), and/or the UE can report the selected FD components per selected TD component (or per sheet). Any or all of the number of selected of TD components, the number of selected spatial beams, and/or the number of selected FD components can be reported by the UE.

As described above, a first approach for the non-zero LC coefficients' selection may be through a bitmap and component composition patterns. To reduce signaling overhead, the component composition patterns and their occurrence frequencies can be indicated to the base station (such as the gNB 1900 (FIG. 19)); Then a Huffman encoding scheme can be used to refer to those patterns instead of using bitmaps to reduce signaling overhead. In a second approach, the NZ LC coefficients' selection may be through multiple bitmaps. The strongest LC coefficient among all spatial beams, FD components, TD components can be shifted to the origin position with respect to FD component and TD component. The same shift may be applied to LC coefficients on all sheets.

Multiple quantizer designs are described herein. For example, the quantizer designs may include LC coefficient quantization that can be through a fixed quantizer (specified in the specification), parameterized quantizers with parameters configurable by gNB and/or reported by the UE. A UE can report a UE defined quantizer to the base station. To allow better quantization, UE-defined quantizer(s) can be provided to the base station with RRC signaling and/or MAC CE and/or CSI report. In addition, multiple versions (all UE defined, UE defined+specified, multiple parameterized, etc.) can be concurrently active, and the UE can refer to the quantizer version in a CSI report. For two stage quantization, LC coefficients can be divided into one or more sets, and a reference amplitude may be determined for each set.

The time-domain dimension for the reported PMI may be determined by the largest gap between CSI feedback and the time where the last precoder can be used. The approaches described herein may support the configuration to allow multiple precoders within the same slot/same PDSCH to account for high Doppler cases. Further, approaches herein may support differential encoding of wideband/subband CQIs across time and/or frequency, Huffman encoding can be used to reduce the feedback overhead.

Figure 14:
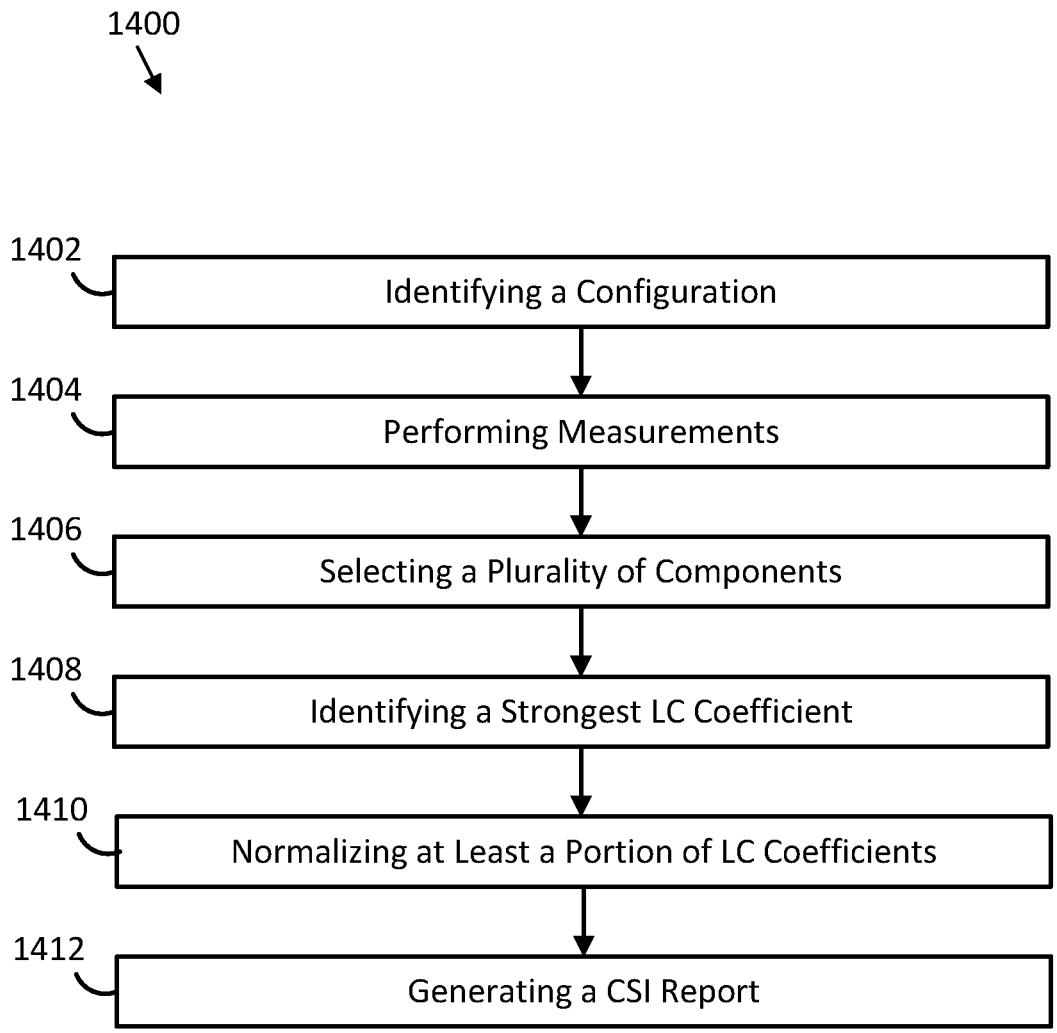
FIG. 14 illustrates an example procedure for generating a CSI report in accordance with some embodiments.

FIG. 14 illustrates an example procedure 1400 for generating a CSI report in accordance with some embodiments. In particular, a UE (such as the UE 1800 (FIG. 18)) may perform the procedure 1400 to generate a CSI report in accordance with approaches described herein.

The procedure 1400 may include identifying a configuration in 1402. In particular, the UE may identify, based on one or more messages received from a base station (such as the gNB 1900 (FIG. 19)), a configuration of CSI measurement resources and a MIMO codebook configuration. The MIMO configuration may have a frequency component configuration with parameters to select a subset of FD components or a TD component configuration with parameters to select a subset of TD components. The configuration of CSI measurement resources and the MIMO codebook may define the UE generates a CSI report. In some embodiments, the parameters may include a ratio which is larger than 0 and no greater than 1 whereby the maximum number of selected FD components is calculated as the quantized value of the product of the ratio and the number of CQI subbands, In some embodiments, the parameters may include a ratio which is larger than 0 and no greater than 1 whereby the maximum number of selected TD components is calculated as the quantized value of the product of the ratio and the number of PDSCH occasions.

The procedure 1400 may include performing measurements in 1404. In particular, the UE may perform measurements of the CSI measurement resources. The measurements of the CSI measurement resources may include one or more PMIs, CQIs, and/or RIs for the CSI measurement resources.

The procedure 1400 may include selecting a plurality of components in 1406. In particular, the UE may select a plurality of components based on the MIMO codebook configuration and the measurements. Selecting the plurality of components may include any of the approaches described herein for selecting components (such as the spatial beam selection and/or the FD component selection and/or TD component selection described herein.

In some embodiments, selecting the plurality of components may include generating, by the UE, a plurality of sheets for a spatial layer, each of the plurality of sheets corresponding to different frequency offsets. Further, the UE may select a portion of the plurality of components corresponding to the spatial layer from the plurality of sheets in these embodiments. The UE may further identify one or more non-zero LC coefficients from the plurality of sheets based on the measurements. In some of these embodiments, the UE may select the portion of the plurality of components based on the identified one or more non-zero LC coefficients.

In some embodiments, the UE may select the plurality of components from a sheet corresponding to a frequency offset for a spatial layer (such as the sheets described throughout this disclosure). The selection of the plurality of components may further include selecting one or more spatial beams based on the one or more spatial beams having at least one-zero LC coefficient. Further, the UE may select one or more FD components of the sheet based on the one or more FD components having at least one non-zero LC coefficient.

In some embodiments, the selection of the plurality of components may include generating a bitmap corresponding to the MIMO codebook configuration. The UE may further identify an FD component of the bitmap without any non-zero LC coefficients. The UE may remove the FD component from the bitmap to generate a modified bitmap. The UE may further select the plurality of components from the modified bitmap.

The procedure 1400 may include identifying a strongest LC coefficient in 1408. In particular, the UE may identify a strongest LC coefficient from the modified bitmap in embodiments where the modified bitmap is generated in 1406. In some embodiments, 1408 may be omitted.

The procedure 1400 may include normalizing at least a portion of LC coefficients in 1410. The UE may normalize at least a portion of LC coefficients with the strongest LC coefficient. For example, the UE may perform one or more of the procedures for normalizing LC coefficients described throughout this disclosure. In some embodiments 1410 may be omitted.

The procedure 1400 may include generating a CSI report in 1412. In particular, the UE may generate a CSI report corresponding to the plurality of components for transmission to the base station. The CSI report may include one or more of the features of the CSI reports described throughout this disclosure.

In some embodiments, generating the CSI report may include generating a first representation and a second representation. In particular, the UE may generate a first representation of the selected one or more spatial beams having at least one non-zero LC coefficient and one or more spatial beams without any non-zero LC coefficients. Further, the UE may generate a second representation of the selected one or more FD components having at least one non-zero LC coefficient and one or more FD components without any non-zero LC coefficients, wherein the CSI report is to include the first representation and the second representation. These embodiments may be performed when the one or more spatial beams and the one or more FD components are selected in 1406. In some embodiments, generation of a first representation is per-sheet. In some embodiments, generation of a second representation is per-sheet. In some embodiments, for each sheet with at least one non-zero LC coefficient, the UE may generate a third representation from the first representation by selecting one or more spatial beams having at least one non-zero LC coefficient at that sheet; the UE may generate a fourth representation one or more FD components out of the second representation having at least one non-zero LC coefficient at that sheet.

In some embodiments, generating the CSI report may include identifying a sheet corresponding to a frequency offset for a spatial layer that is without a non-zero LC coefficient. The UE may further generate an indication of the sheet to be included in the CSI report. In some embodiments, generating the CSI report may include identifying a sheet corresponding to a frequency offset for a spatial layer that is with at least a non-zero LC coefficient. The UE may further generate an indication of the sheet to be included in the CSI report.

In some embodiments, generating the CSI report may further include generating a bitmap. In particular, the UE may generate a bitmap corresponding to the MIMO codebook configuration. The UE may further identify an FD component of the bitmap without any non-zero LC coefficients. The UE may remove the FD component from the bitmap to generate a modified bitmap. Further, the UE may select the plurality of components from the modified bitmap. In some embodiment, generating bitmap is per-sheet along with the generation of a third representation and/or a fourth representation per-sheet.

Figure 15A:
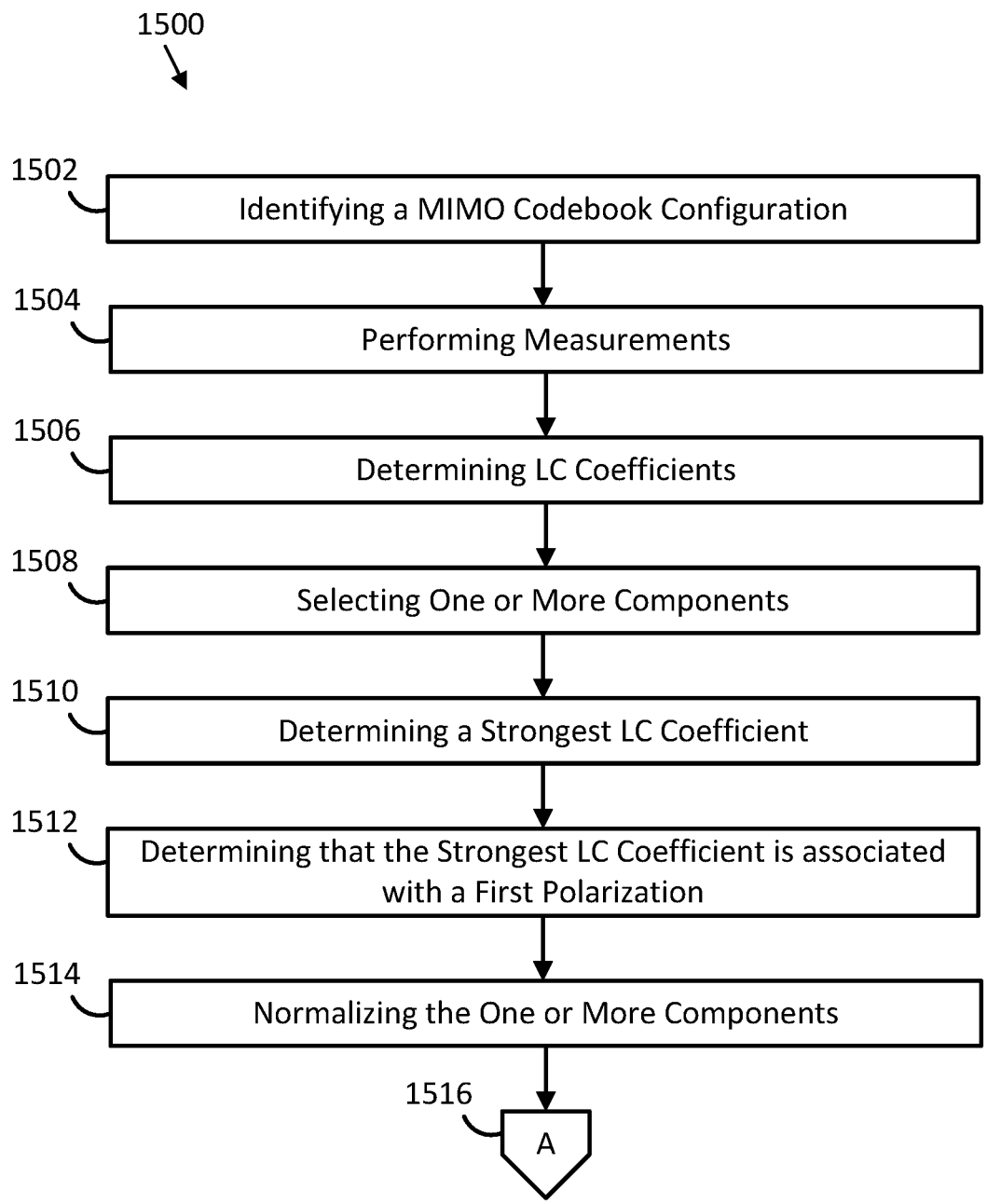
FIG. 15A illustrates a first portion of another example procedure for generating a CSI report in accordance with some embodiments.
Figure 15B:
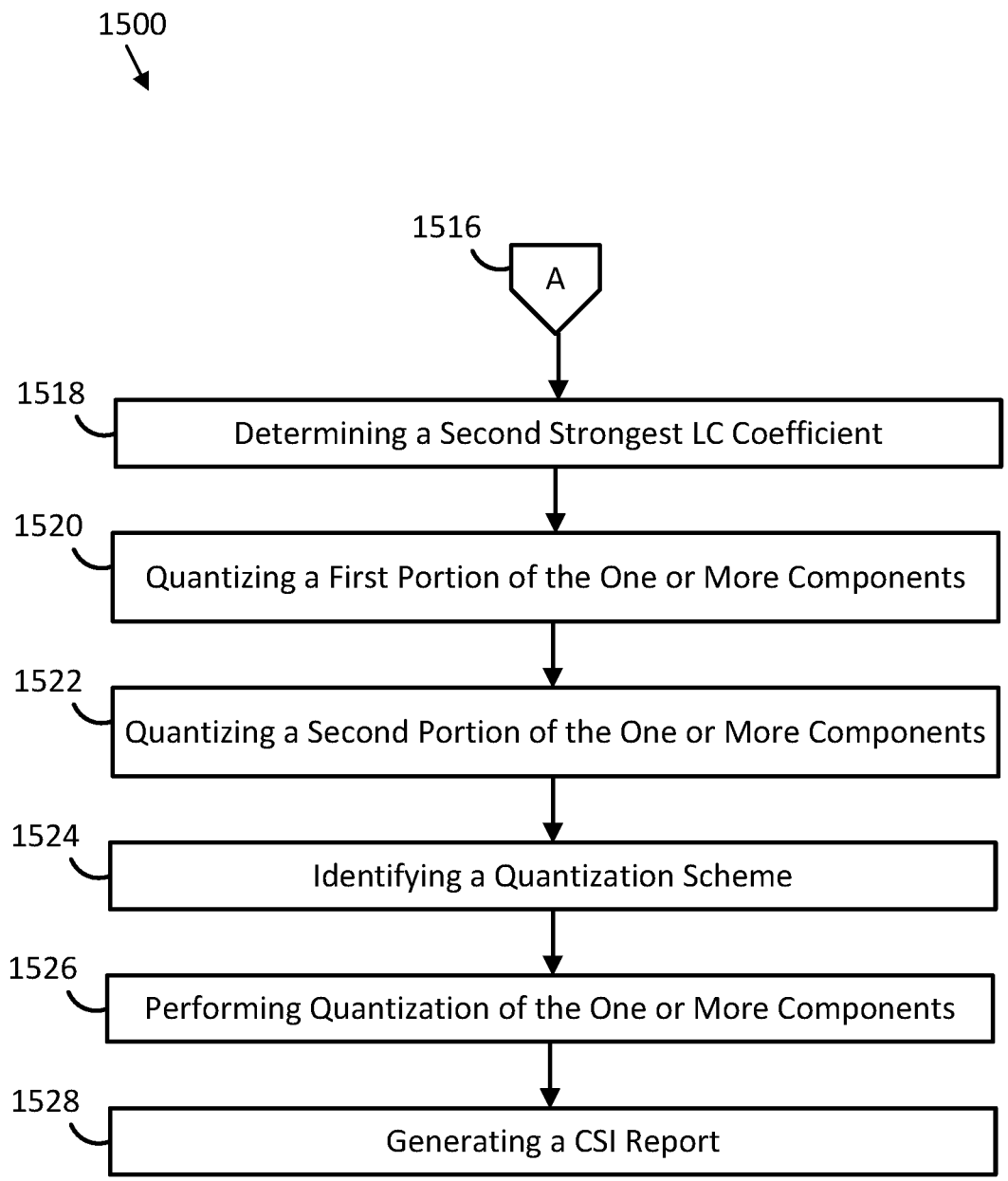
FIG. 15B illustrates a second portion of the procedure in accordance with some embodiments.

FIG. 15A illustrates a first portion of another example procedure 1500 for generating a CSI report in accordance with some embodiments. FIG. 15B illustrates a second portion of the procedure 1500 in accordance with some embodiments. In particular, a UE (such as the UE 1800 (FIG. 18)) may perform the procedure 1500 to generate a CSI report.

The procedure 1500 may include identifying a MIMO codebook configuration in 1502. In particular, the UE may identify a MIMO codebook configuration having a frequency component configuration with parameters to select a subset of FD components or a TD component configuration with parameters to select a subset of TD components. In some embodiments, the parameters may include a ratio which is larger than 0 and no greater than 1 whereby the maximum number of selected FD components is calculated as the quantized value of the product of the ratio and the number of CQI subbands, In some embodiments, the parameters may include a ratio which is larger than 0 and no greater than 1 whereby the maximum number of selected TD components is calculated as the quantized value of the product of the ratio and the number of PDSCH occasions.

The procedure 1500 may further include performing measurements in 1504. In particular, the UE may perform measurements of CSI measurement resources. In some embodiments, the CSI measurement resources may be detected by a radio frequency (RF) interface circuitry of the UE received from a base station (such as the gNB 1900 (FIG. 19)).

The procedure 1500 may determine LC coefficients in 1506. In particular, the UE may determine LC coefficients for components based on the measurements. For example, the UE may determine the LC coefficients as described throughout this disclosure.

The procedure 1500 may further include selecting one or more components in 1508. In particular, the UE may select one or more components from the components based on the LC coefficients and the MIMO codebook configuration.

In some embodiments, the selection of the one or more components may include generating a plurality of sheets. In particular, the UE may generate a plurality of sheets (such as the sheets described throughout this disclosure) for a spatial layer, each of the plurality of sheets corresponding to different frequency offsets. The UE may further select a portion of the one or more components corresponding to the spatial layer from the plurality of sheets. In some of these embodiments, the UE may select the portion of the one or more components based on one or more components being associated with non-zero LC coefficients.

The procedure 1500 may further include determining the a strongest LC coefficient in 1510. In particular, the UE may determine a strongest LC coefficient from the LC coefficients. For example, the UE may determine the strongest LC coefficient with the approaches for determining the strongest LC coefficient described throughout this disclosure. In some embodiments, 1510 may be omitted.

The procedure 1500 may include determining that the strongest LC coefficient is associated with a first polarization in 1512. In particular, the UE may determine that the strongest LC coefficient is associated with a first polarization. The UE may determine that the strongest LC coefficient is associated with the first polarization in accordance with any of the approaches described herein. In some embodiments, 1512 may be omitted.

The procedure 1500 may include normalizing a portion of the one or more components in 1514. In particular, the UE may normalize a portion of the one or more components based on the strongest LC coefficient. The UE may normalize the amplitudes and/or the phase of the portion of the one or more components. For example, the UE may perform normalization of the one or more components in accordance with any of the approaches of performing normalization described herein. In some embodiments, 1514 may be omitted. The procedure 1500 may proceed with FIG. 15B at 1516.

The procedure 1500 may include determining a second strongest LC coefficient in 1518. In particular, the UE may determine a second strongest LC coefficient associated with a second polarization from the LC coefficients. For example, the UE may determine the second strongest LC coefficient with any of the approaches of determining second strongest LC coefficients described herein. In some embodiments, 1518 may be omitted.

The procedure 1500 may include quantizing a first portion of the one or more components in 1520. In particular, the UE may quantize a first portion of the one or more components based on the strongest LC coefficient. In some embodiments, 1520 may be omitted.

The procedure 1500 may include quantizing a second portion of the one or more components in 1522. In particular, the UE may quantize a second portion of the one or more components based on the second strongest LC coefficient. The first portion of the one or more components may be associated with the first polarization and the second portion of the one or more components may be associated with the second polarization. In some embodiments, 1522 may be omitted.

The procedure 1500 may further include identifying a quantization scheme in 1524. In particular, the UE may identify a quantization scheme for the one or more components. In some embodiments, the quantization scheme may include an amplitude quantization and a phase quantization. In some embodiments, 1524 may be omitted.

The procedure 1500 may further include performing quantization of the one or more components in 1526. In particular, the UE may perform quantization of the one or more components based on the quantization scheme. In some embodiments, performing the quantization may include applying the amplitude quantization and the phase quantization to the one or more components. For example, the UE may perform the quantization of the one or more components in accordance with the approaches of quantization described herein. In some embodiments, 1526 may be omitted.

The procedure 1500 may include generating a CSI report in 1528. In particular, the UE may generate a CSI report that includes information for the one or more components. The UE may transmit the CSI report to the base station.

Figure 16:
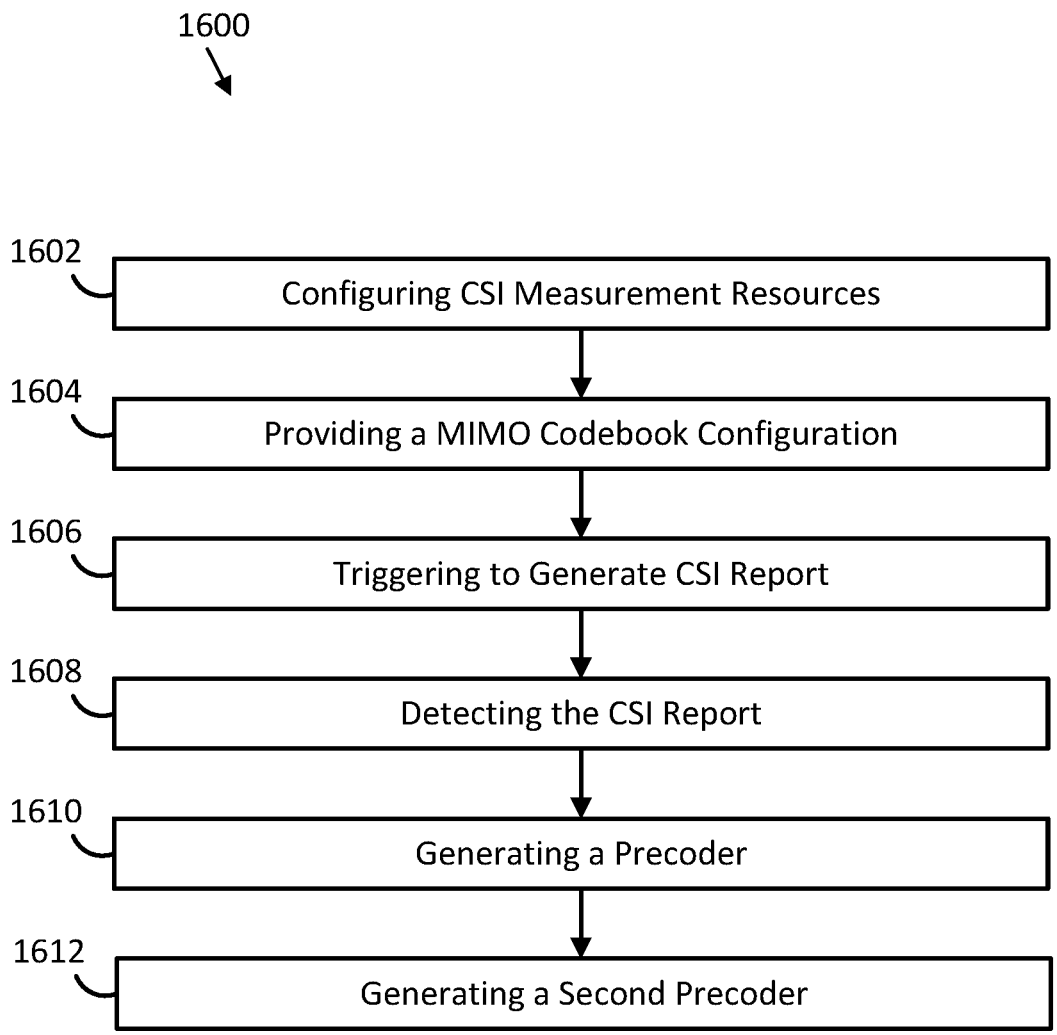
FIG. 16 illustrates an example procedure for configuring a user equipment (UE) for a CSI report in accordance with some embodiments.

FIG. 16 illustrates an example procedure 1600 for configuring a UE for a CSI report in accordance with some embodiments. In particular, a base station (such as the gNB 1900 (FIG. 19)) may perform the procedure 1600 for configuring a UE (such as the UE 1800 (FIG. 18)) for a CSI report.

The procedure 1600 may include configuring CSI measurement resources in 1602. In particular, the base station may configure CSI measurement resources for CSI measurement by a UE.

The procedure 1600 may further include providing a MIMO codebook configuration in 1604. In particular, the base station may provide a MIMO codebook configuration to the UE. The MIMO codebook configuration may have a frequency component configuration with parameters to select a subset of FD components or a TD component configuration with parameters to select a subset of TD components. In some embodiments, the MIMO codebook configuration may further indicate a quantization scheme to be utilized by the UE. In some embodiments, the parameters may include a ratio which is larger than 0 and no greater than 1 whereby the maximum number of selected FD components is calculated as the quantized value of the product of the ratio and the number of CQI subbands; and in some embodiments the UE reports the number of selected FD components and the selected FD components. In some embodiments, the parameters may include a ratio which is larger than 0 and no greater than 1 whereby the maximum number of selected TD components is calculated as the quantized value of the product of the ratio and the number of PDSCH occasions; and in some embodiments the UE reports the number of selected TD components and the selected TD components. In some embodiments, the parameters may include a ratio which is larger than 0 and no greater than 1 whereby the maximum number of non-zero LC coefficients from selected TD components and selected FD components is calculated as the product of the ratio, the maximum number of selected TD components and the maximum number of selected FD components; in some embodiments the UE reports the number of selected non-zero LC coefficients from selected non-zero LC coefficients from all the selected TD components and selected FD components. In some embodiments, the parameters may include a ratio which is larger than 0 and no greater than 1 whereby the maximum number of non-zero LC coefficients from selected TD components and selected FD components is calculated as the product of the ratio, the maximum number of selected TD components, the maximum number of selected FD components and the number of spatial layers; in some embodiments the UE reports the number of selected non-zero LC coefficients from selected non-zero LC coefficients from all the selected TD components and selected FD components and all spatial layers.

The procedure 1600 may further include triggering to generate a CSI report in 1606. In particular, the base station may trigger the UE to generate a CSI report. In some embodiments, the UE may transmit the CSI report to the base station based on the generation of the CSI report.

The procedure 1600 may further include detecting the CSI report in 1608. In particular, the base station may detect the CSI report received from the UE. In some embodiments, 1608 may be omitted.

The procedure 1600 may further include generating a precoder in 1610. In particular, the base station may generate a precoder based on the CSI report. The precoder may be utilized for a plurality of symbols. In some embodiments, 1610 may be omitted.

The procedure 1600 may further include generating a second precoder in 1612. In particular, the base station may generate a second precoder based on the CSI report. The second precoder may be utilized for a second plurality of symbols. In some embodiments, 1612 may be omitted.

Figure 17:
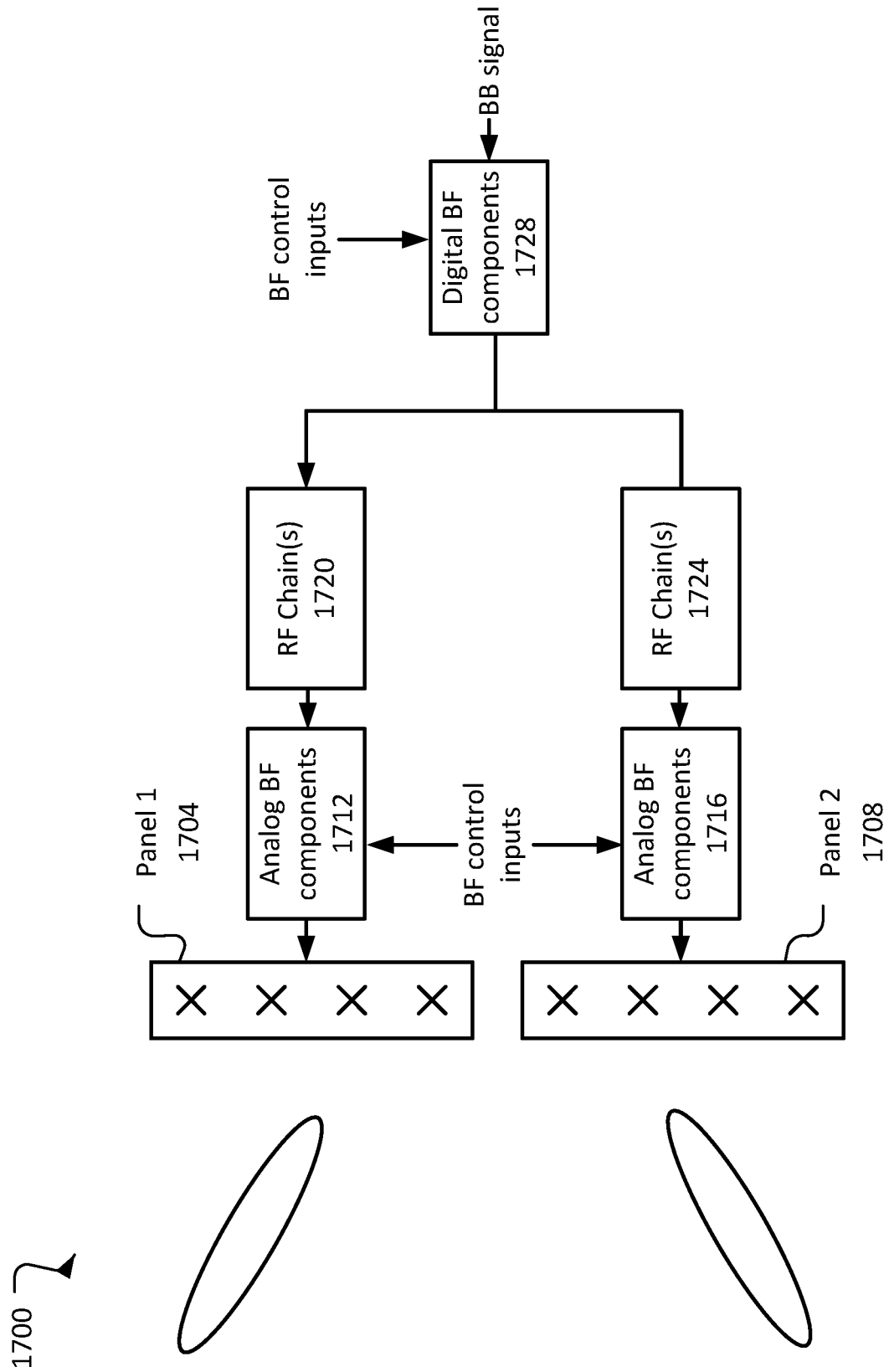
FIG. 17 illustrates example beamforming circuitry in accordance with some embodiments.

FIG. 17 illustrates example beamforming circuitry 1700 in accordance with some embodiments. The beamforming circuitry 1700 may include a first antenna panel, panel 1 1704, and a second antenna panel, panel 2 1708. Each antenna panel may include a number of antenna elements. Other embodiments may include other numbers of antenna panels.

Figure 18:
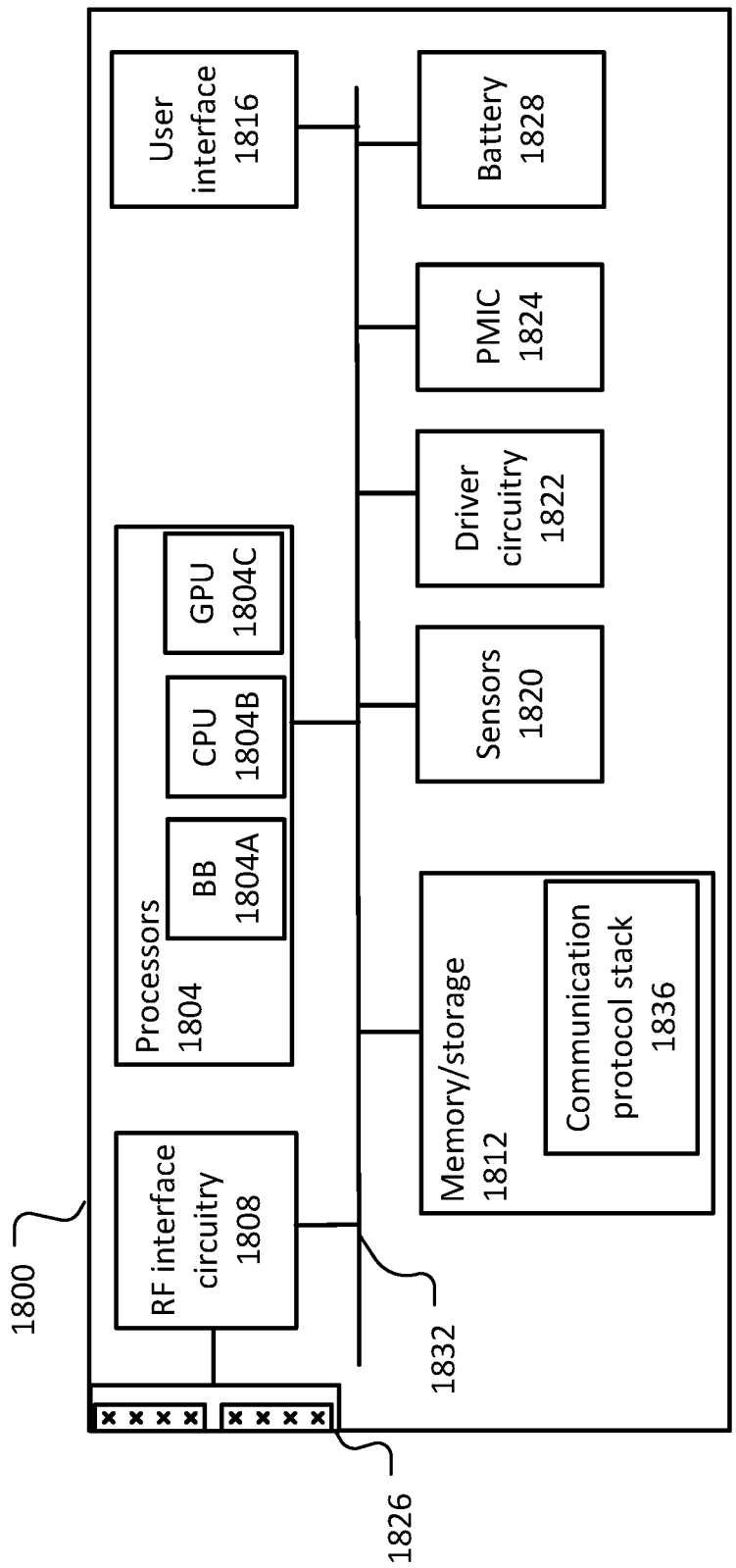
FIG. 18 illustrates an example UE in accordance with some embodiments.

Digital beamforming (BF) components 1728 may receive an input baseband (BB) signal from, for example, a baseband processor such as, for example, baseband processor 1804A of FIG. 18. The digital BF components 1728 may rely on complex weights to pre-code the BB signal and provide a beamformed BB signal to parallel radio frequency (RF) chains 1720/1724.

Each RF chain 1720/1724 may include a digital-to-analog converter to convert the BB signal into the analog domain; a mixer to mix the baseband signal to an RF signal; and a power amplifier to amplify the RF signal for transmission.

The RF signal may be provided to analog BF components 1712/1716, which may apply additionally beamforming by providing phase shifts in the analog domain. The RF signals may then be provided to antenna panels 1704/1708 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 18 illustrates an example UE 1800 in accordance with some embodiments. The UE 1800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1800 may be a RedCap UE or NR-Light UE.

The UE 1800 may include processors 1804, RF interface circuitry 1808, memory/storage 1812, user interface 1816, sensors 1820, driver circuitry 1822, power management integrated circuit (PMIC) 1824, antenna structure 1826, and battery 1828. The components of the UE 1800 may be implemented as integrated circuits (ICs), portions thereof, discrete electronic devices, or other modules, logic, hardware, software, firmware, or a combination thereof. The block diagram of FIG. 18 is intended to show a high-level view of some of the components of the UE 1800. However, some of the components shown may be omitted, additional components may be present, and different arrangement of the components shown may occur in other implementations.

The components of the UE 1800 may be coupled with various other components over one or more interconnects 1832, which may represent any type of interface, input/output, bus (local, system, or expansion), transmission line, trace, optical connection, etc. that allows various circuit components (on common or different chips or chipsets) to interact with one another.

The processors 1804 may include processor circuitry such as, for example, baseband processor circuitry (BB) 1804A, central processor unit circuitry (CPU) 1804B, and graphics processor unit circuitry (GPU) 1804C. The processors 1804 may include any type of circuitry or processor circuitry that executes or otherwise operates computer-executable instructions, such as program code, software modules, or functional processes from memory/storage 1812 to cause the UE 1800 to perform operations as described herein.

In some embodiments, the baseband processor circuitry 1804A may access a communication protocol stack 1836 in the memory/storage 1812 to communicate over a 3GPP compatible network. In general, the baseband processor circuitry 1804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1808.

The baseband processor circuitry 1804A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1812 may include one or more non-transitory, computer-readable media that includes instructions (for example, communication protocol stack 1836) that may be executed by one or more of the processors 1804 to cause the UE 1800 to perform various operations described herein. The memory/storage 1812 include any type of volatile or non-volatile memory that may be distributed throughout the UE 1800. In some embodiments, some of the memory/storage 1812 may be located on the processors 1804 themselves (for example, L1 and L2 cache), while other memory/storage 1812 is external to the processors 1804 but accessible thereto via a memory interface. The memory/storage 1812 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1808 may include transceiver circuitry and radio frequency front module (RFEM) that allows the UE 1800 to communicate with other devices over a radio access network. The RF interface circuitry 1808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1826 and proceed to filter and amplify (with a low-noise amplifier) the signal. The signal may be provided to a receiver of the transceiver that down-converts the RF signal into a baseband signal that is provided to the baseband processor of the processors 1804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1826.

In various embodiments, the RF interface circuitry 1808 may be configured to transmit/receive signals in a manner compatible with NR access technologies.

The antenna 1826 may include antenna elements to convert electrical signals into radio waves to travel through the air and to convert received radio waves into electrical signals. The antenna elements may be arranged into one or more antenna panels. The antenna 1826 may have antenna panels that are omnidirectional, directional, or a combination thereof to enable beamforming and multiple-input, multiple-output communications. The antenna 1826 may include microstrip antennas, printed antennas fabricated on the surface of one or more printed circuit boards, patch antennas, phased array antennas, etc. The antenna 1826 may have one or more panels designed for specific frequency bands including bands in FR1 or FR2.

In some embodiments, the UE 1800 may include the beamforming circuitry 1700 (FIG. 17), where the beamforming circuitry 1700 may be utilized for communication with the UE 1800. In some embodiments, components of the UE 1800 and the beamforming circuitry may be shared. For example, the antennas 1826 of the UE may include the panel 1 1704 and the panel 2 1708 of the beamforming circuitry 1700.

The user interface circuitry 1816 includes various input/output (I/O) devices designed to enable user interaction with the UE 1800. The user interface 1816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1800.

The sensors 1820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1822 may include software and hardware elements that operate to control particular devices that are embedded in the UE 1800, attached to the UE 1800, or otherwise communicatively coupled with the UE 1800. The driver circuitry 1822 may include individual drivers allowing other components to interact with or control various input/output (I/O) devices that may be present within, or connected to, the UE 1800. For example, driver circuitry 1822 may include a display driver to control and allow access to a display device, a touchscreen driver to control and allow access to a touchscreen interface, sensor drivers to obtain sensor readings of sensor circuitry 1820 and control and allow access to sensor circuitry 1820, drivers to obtain actuator positions of electro-mechanic components or control and allow access to the electro-mechanic components, a camera driver to control and allow access to an embedded image capture device, audio drivers to control and allow access to one or more audio devices.

The PMIC 1824 may manage power provided to various components of the UE 1800. In particular, with respect to the processors 1804, the PMIC 1824 may control power-source selection, voltage scaling, battery charging, or DC-to-DC conversion.

In some embodiments, the PMIC 1824 may control, or otherwise be part of, various power saving mechanisms of the UE 1800. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1800 may power down for brief intervals of time and thus save power. If there is no data traffic activity for an extended period of time, then the UE 1800 may transition off to an RRC_Idle state, where it disconnects from the network and does not perform operations such as channel quality feedback, handover, etc. The UE 1800 goes into a very low power state and it performs paging where again it periodically wakes up to listen to the network and then powers down again. The UE 1800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1828 may power the UE 1800, although in some examples the UE 1800 may be mounted deployed in a fixed location, and may have a power supply coupled to an electrical grid. The battery 1828 may be a lithium ion battery, a metal-air battery, such as a zinc-air battery, an aluminum-air battery, a lithium-air battery, and the like. In some implementations, such as in vehicle-based applications, the battery 1828 may be a typical lead-acid automotive battery.

Figure 19:
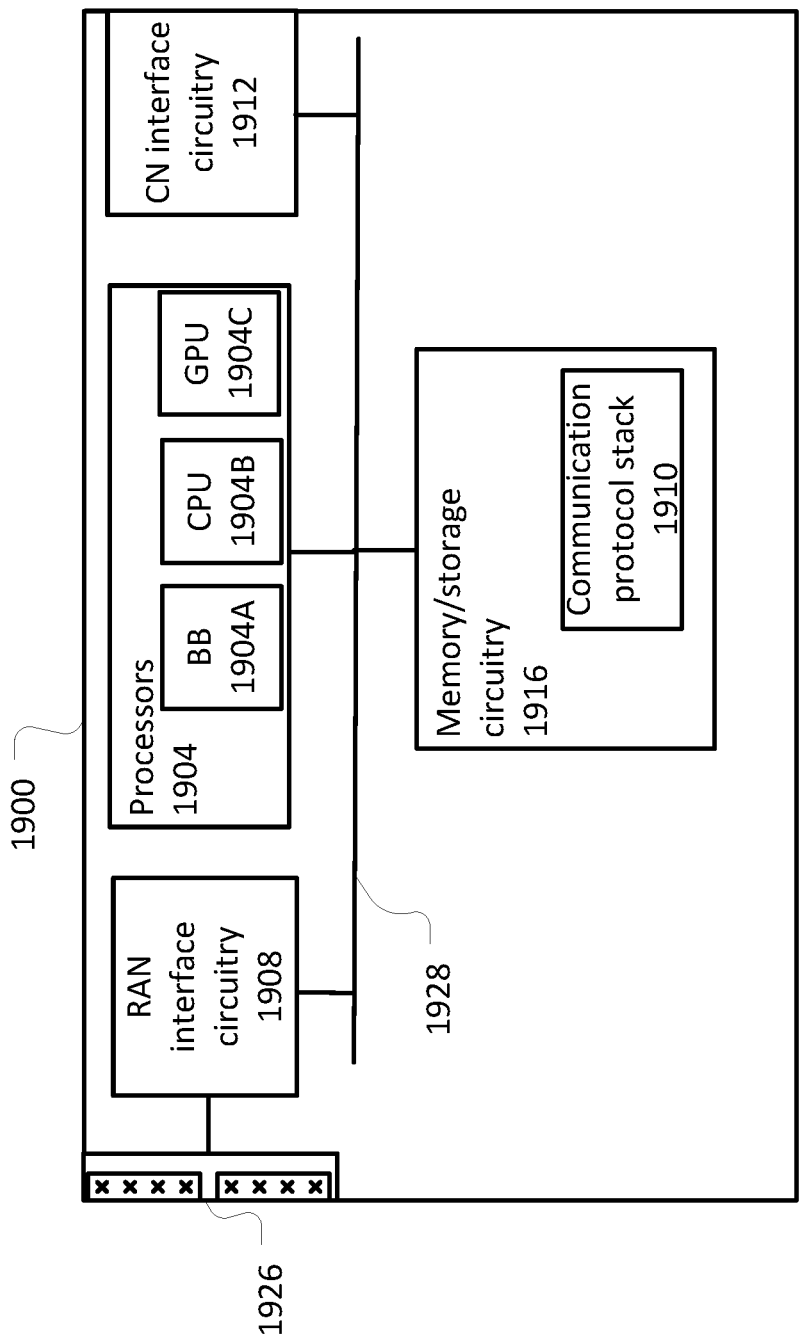
FIG. 19 illustrates an example next generation nodeB (gNB) in accordance with some embodiments.

FIG. 19 illustrates an example gNB 1900 in accordance with some embodiments. The gNB 1900 may include processors 1904, RF interface circuitry 1908, core network (CN) interface circuitry 1912, memory/storage circuitry 1916, and antenna structure 1926.

The components of the gNB 1900 may be coupled with various other components over one or more interconnects 1928.

The processors 1904, RF interface circuitry 1908, memory/storage circuitry 1916 (including communication protocol stack 1910), antenna structure 1926, and interconnects 1928 may be similar to like-named elements shown and described with respect to FIG. 18.

The CN interface circuitry 1912 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1900 via a fiber optic or wireless backhaul. The CN interface circuitry 1912 may include one or more dedicated processors or FPGAs to communicate using one or more of the aforementioned protocols. In some implementations, the CN interface circuitry 1912 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method comprising identifying, based on one or more messages received from a base station, a configuration of channel state information (CSI) measurement resources and a multiple-input, multiple-output (MIMO) codebook configuration having a frequency component configuration with parameters to select a subset of frequency domain (FD) components or a time domain (TD) component configuration with parameters to select a subset of TD components, performing measurements of the CSI measurement resources, selecting a plurality of components based on the MIMO codebook configuration and the measurements, and generating a CSI report corresponding to the plurality of components for transmission to the base station.

Example 2 may include the method of example 1, wherein selecting the plurality of components includes generating a plurality of sheets for a spatial layer, each of the plurality of sheets corresponding to different frequency offsets, and selecting a portion of the plurality of components corresponding to the spatial layer from the plurality of sheets.

Example 3 may include the method of example 2, wherein selecting the portion of the plurality of components includes identifying one or more non-zero linear combination (LC) coefficients from the plurality of sheets based on the measurements, and selecting the portion of the plurality of components based on the identified one or more non-zero LC coefficients.

Example 4 may include the method of example 2, wherein generating the CSI report includes generating one or more indications of one or more sheets of the plurality of sheets corresponding to the portion of the plurality of components that are selected, the one or more indications included in the CSI report.

Example 5 may include the method of example 1, wherein the plurality of components are selected from a sheet corresponding to a frequency offset for a spatial layer, and wherein selecting the plurality of components includes to selecting one or more spatial beams based on the one or more spatial beams having at least one non-zero linear combination (LC) coefficient, and selecting one or more FD components of the sheet based on the one or more FD components having at least one non-zero LC coefficient.

Example 6 may include the method of example 5, wherein generating the CSI report includes generating a first representation of the selected one or more spatial beams having at least one non-zero LC coefficient and one or more spatial beams without any non-zero LC coefficients, and generating a second representation of the selected one or more FD components having at least one non-zero LC coefficient and one or more FD components without any non-zero LC coefficients, wherein the CSI report includes the first representation and the second representation.

Example 7 may include the method of example 1, wherein generating the CSI report includes identifying a sheet corresponding to a frequency offset for a spatial layer that is without a non-zero linear combination (LC) coefficient, and generating an indication of the sheet to be included in the CSI report.

Example 8 may include the method of example 1, wherein selecting the plurality of components includes generating a bitmap corresponding to the MIMO codebook configuration, identifying an FD component of the bitmap without any non-zero linear combination (LC) coefficients, removing the FD component from the bitmap to generate a modified bitmap, and selecting the plurality of components from the modified bitmap.

Example 9 may include the method of example 8, further comprising identifying a strongest LC coefficient from the modified bitmap, and normalizing at least a portion of LC coefficients with the strongest LC coefficient.

Example 10 may include a method, comprising identifying a multiple-input, multiple-output (MIMO) codebook configuration having a frequency component configuration with parameters to select a subset of frequency domain (FD) components or a time domain (TD) component configuration with parameters to select a subset of TD components, performing measurements of the CSI measurement resources, determining linear combination (LC) coefficients for components based on the measurements, selecting one or more components from the components based on the LC coefficients and the MIMO codebook configuration, and generating a CSI report that includes information for the one or more components.

Example 11 may include the method of example 10, further comprising determining a strongest LC coefficient from the LC coefficients, and normalizing the one or more components based on the strongest LC coefficient.

Example 12 may include the method of example 11, wherein the strongest LC coefficient is a first strongest LC coefficient, and wherein the method further comprises determining that the first strongest LC coefficient is associated with a first polarization, quantizing a first portion of the one or more components based on the first strongest LC coefficient, determining a second strongest LC coefficient associated with a second polarization from the LC coefficients, and quantizing a second portion of the one or more components based on the second strongest LC coefficient, wherein the first portion of the one or more components are associated with the first polarization and the second portion of the one or more components are associated with the second polarization.

Example 13 may include the method of example 10, further comprising identifying a quantization scheme for the one or more components, and performing quantization of the one or more components based on the quantization scheme.

Example 14 may include the method of example 13, wherein the quantization scheme comprises an amplitude quantization and a phase quantization, and wherein performing the quantization of the one or more components includes applying the amplitude quantization and the phase quantization to the one or more components.

Example 15 may include the method of example 10, wherein selecting the one or more components includes generating a plurality of sheets for a spatial layer, each of the plurality of sheets corresponding to different frequency offsets, and selecting a portion of the one or more components corresponding to the spatial layer from the plurality of sheets.

Example 16 may include the method of example 15, wherein selecting the portion of the one or more components includes selecting the portion of the one or more components based on the one or more components being associated with non-zero LC coefficients.

Example 17 may include a method of configuring a channel state information (CSI) report, comprising configuring, by a base station, CSI measurement resources for CSI measurement by a user equipment (UE), providing, by the base station, a multiple-input, multiple-output (MIMO) codebook configuration to the UE, the MIMO codebook configuration having a frequency component configuration with parameters to select a subset of frequency domain (FD) components or a time domain (TD) component configuration with parameters to select a subset of TD components, and triggering, by the base station, the UE to generate the CSI report.

Example 18 may include the method of example 17, further comprising detecting, by the base station, the CSI report received from the UE, and generating, by the base station, a precoder based on the CSI report, the precoder to be utilized for a plurality of symbols.

Example 19 may include the method of example 18, wherein the precoder is a first precoder, wherein the plurality of symbols is a first plurality of symbols, and wherein the method further comprises generating, by the base station, a second precoder based on the CSI report, the second precoder to be utilized for a second plurality of symbols.

Example 20 may include the method of example 17, wherein the MIMO codebook configuration further indicates a quantization scheme to be utilized by the UE.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    identifying, based on one or more messages received from a base station, a configuration of channel state information (CSI) measurement resources and a multiple-input, multiple-output (MIMO) codebook configuration having a time domain (TD) component configuration with parameters to select a subset of TD components;
    performing measurements of the CSI measurement resources;
    generating a bitmap corresponding to the MIMO codebook configuration;
    identifying a frequency domain (FD) component of the bitmap without any non-zero linear combination (LC) coefficients;
    removing the FD component from the bitmap to generate a modified bitmap;
    selecting, from the modified bitmap, a plurality of components based on the MIMO codebook configuration and the measurements; and
    generating a CSI report corresponding to the plurality of components for transmission to the base station.

2. The method of claim 1, wherein selecting the plurality of components includes:
    generating a plurality of sheets for a spatial layer, each of the plurality of sheets corresponding to different frequency offsets; and
    selecting a portion of the plurality of components corresponding to the spatial layer from the plurality of sheets.

3. The method of claim 2, wherein selecting the portion of the plurality of components includes:
    identifying one or more non-zero linear combination (LC) coefficients from the plurality of sheets based on the measurements; and
    selecting the portion of the plurality of components based on the identified one or more non-zero LC coefficients.

4. The method of claim 2, wherein generating the CSI report includes generating one or more indications of one or more sheets of the plurality of sheets corresponding to the portion of the plurality of components that are selected, the one or more indications included in the CSI report.

5. The method of claim 1, wherein the plurality of components are selected from a sheet corresponding to a frequency offset for a spatial layer, and wherein selecting the plurality of components includes:
    selecting one or more spatial beams based on the one or more spatial beams having at least one non-zero linear combination (LC) coefficient; and
    selecting one or more frequency domain (FD) components of the sheet based on the one or more FD components having at least one non-zero LC coefficient.

6. The method of claim 5, wherein generating the CSI report includes:
    generating a first representation of the selected one or more spatial beams having at least one non-zero LC coefficient and one or more spatial beams without any non-zero LC coefficients; and
    generating a second representation of the selected one or more FD components having at least one non-zero LC coefficient and one or more FD components without any non-zero LC coefficients, wherein the CSI report includes the first representation and the second representation.

7. The method of claim 1, wherein generating the CSI report includes:
    identifying a sheet corresponding to a frequency offset for a spatial layer that is without a non-zero linear combination (LC) coefficient; and
    generating an indication of the sheet to be included in the CSI report.

8. The method of claim 1, further comprising:
    identifying a strongest LC coefficient from the modified bitmap; and
    normalizing at least a portion of LC coefficients with the strongest LC coefficient.

9. An apparatus comprising:
    processing circuitry to:
        identify a multiple-input, multiple-output (MIMO) codebook configuration having a time domain (TD) component configuration with parameters to select a subset of TD components;
        perform measurements of channel state information (CSI) measurement resources;
        determine linear combination (LC) coefficients for components based on the measurements;
        select one or more components from the components based on the LC coefficients and the MIMO codebook configuration;
        determine a first strongest LC coefficient from the LC coefficients;
        normalize the one or more components based on the first strongest LC coefficient;
        determine that the first strongest LC coefficient is associated with a first polarization;

quantize a first portion of the one or more components based on the first strongest LC coefficient;

determine a second strongest LC coefficient associated with a second polarization from the LC coefficients;

quantize a second portion of the one or more components based on the second strongest LC coefficient, wherein the first portion of the one or more components are associated with the first polarization and the second portion of the one or more components are associated with the second polarization; and generate a CSI report that includes information for the one or more components; and interface circuitry coupled with the processing circuitry, the interface circuitry to enable communication.

10. The apparatus of claim 9, wherein the processing circuitry is further to:

identify a quantization scheme for the one or more components, wherein the first portion of the one or more components and the second portion of the one or more components are quantized based on the quantization scheme.

11. The apparatus of claim 10, wherein the quantization scheme comprises an amplitude quantization and a phase quantization, and wherein to quantize the first portion of the one or more components includes to apply the amplitude quantization and the phase quantization to the first portion of the one or more components.

12. The apparatus of claim 9, wherein to select the one or more components includes to:

generate a plurality of sheets for a spatial layer, each of the plurality of sheets corresponding to different frequency offsets; and select a portion of the one or more components corresponding to the spatial layer from the plurality of sheets.

13. The apparatus of claim 12, wherein to select the portion of the one or more components includes to select the portion of the one or more components based on the one or more components being associated with non-zero LC coefficients.

14. A method comprising:

configuring channel state information (CSI) measurement resources for CSI measurement by a user equipment (UE);

providing a multiple-input, multiple-output (MIMO) codebook configuration to the UE, the MIMO codebook configuration having a time domain (TD) component configuration with parameters to select a subset of TD components;

triggering the UE to generate a CSI report; and detecting the CSI report received from the UE, the CSI report including an indication of a frequency domain (FD) component that has been removed from a bitmap corresponding to the MIMO codebook configuration, the FD component being removed based on the FD component being without any non-zero LC coefficients, wherein the CSI report corresponds to a plurality of components selected based on the bitmap with the FD component removed.

15. The method of claim 14, further comprising:

generating a precoder based on the CSI report, the precoder to be utilized for a plurality of symbols.

16. The method of claim 15, wherein the precoder is a first precoder, wherein the plurality of symbols is a first plurality of symbols, and wherein the method further comprises generating a second precoder based on the CSI report, the second precoder to be utilized for a second plurality of symbols.

17. The method of claim 14, wherein the MIMO codebook configuration further indicates a quantization scheme to be utilized by the UE.

* * * * *